United States Patent
Wright

Patent Number: 6,139,247
Date of Patent: Oct. 31, 2000

[54] TILTABLE HAULING DEVICE

[76] Inventor: Bryan Wright, 27289 County Rd. N., Dolores, Colo. 81323

[21] Appl. No.: 08/925,306

[22] Filed: Sep. 8, 1997

[51] Int. Cl.⁷ .................................................. B60R 9/060
[52] U.S. Cl. ........................... 414/462; 224/519; 298/18; 414/470
[58] Field of Search .............................. 298/18; 414/462; 224/495, 509, 519, 521

[56] References Cited

U.S. PATENT DOCUMENTS

| | | | |
|---|---|---|---|
| 4,138,159 | 2/1979 | Hall | 298/18 |
| 4,234,284 | 11/1980 | Hauff | 414/462 |
| 4,378,883 | 4/1983 | Profeta | 206/335 |
| 4,394,947 | 7/1983 | Tartaglia | 224/42.43 |
| 4,635,835 | 1/1987 | Cole | 224/42.08 |
| 4,640,658 | 2/1987 | Webb, Jr. | 414/462 |
| 4,650,124 | 3/1987 | Connaughty et al. | 239/708 |
| 4,676,413 | 6/1987 | Began et al. | 224/42.038 |
| 4,915,276 | 4/1990 | Devito | 224/42.43 |
| 4,934,894 | 6/1990 | White | 414/462 |
| 5,018,657 | 5/1991 | Hull et al. | 414/462 X |
| 5,123,800 | 6/1992 | Druse, Sr. | 298/18 X |
| 5,857,824 | 1/1999 | De Aquiar | 414/462 |

*Primary Examiner*—Janice L. Krizek
*Attorney, Agent, or Firm*—Allen H. Erickson

[57] ABSTRACT

A drive-up equipment transporting apparatus 10 has a tiltable carrying rack 30 hinged to a frame member 22. The rack 30 is lockable in an untilted or tilted position, the latter position for driving an ATV or other small vehicle 18 from ground level 16 onto or from the rack. An outrigger 24 projects from frame member 22 to support the non-loading side 36 of the rack 30. The frame member 22 comprises a square tubing member having a front end insertable into a Class 4 hitch receiver 14 of a host vehicle. In an alternative embodiment, a square tubing member comprises the frame 432 of a wheeled trailer 430 with a terminal hitch 444. A plurality of carrying racks 30 are hinged to centrally tilt about the frame 432.

34 Claims, 16 Drawing Sheets

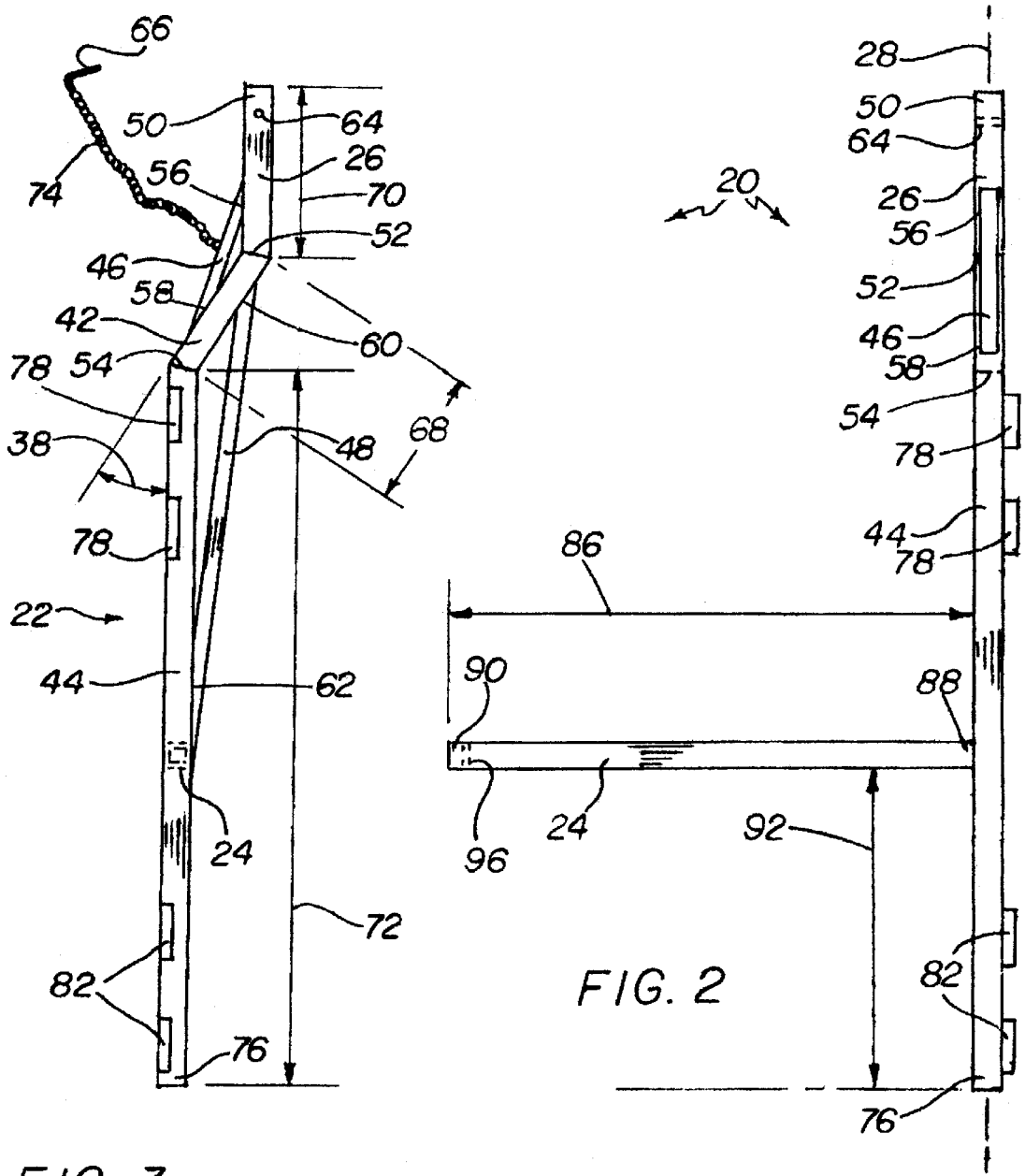
FIG. 3
FIG. 2
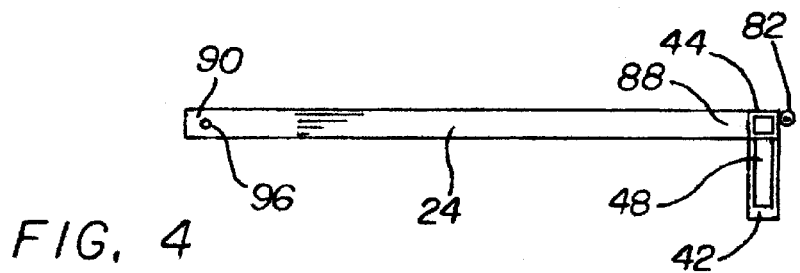
FIG. 4

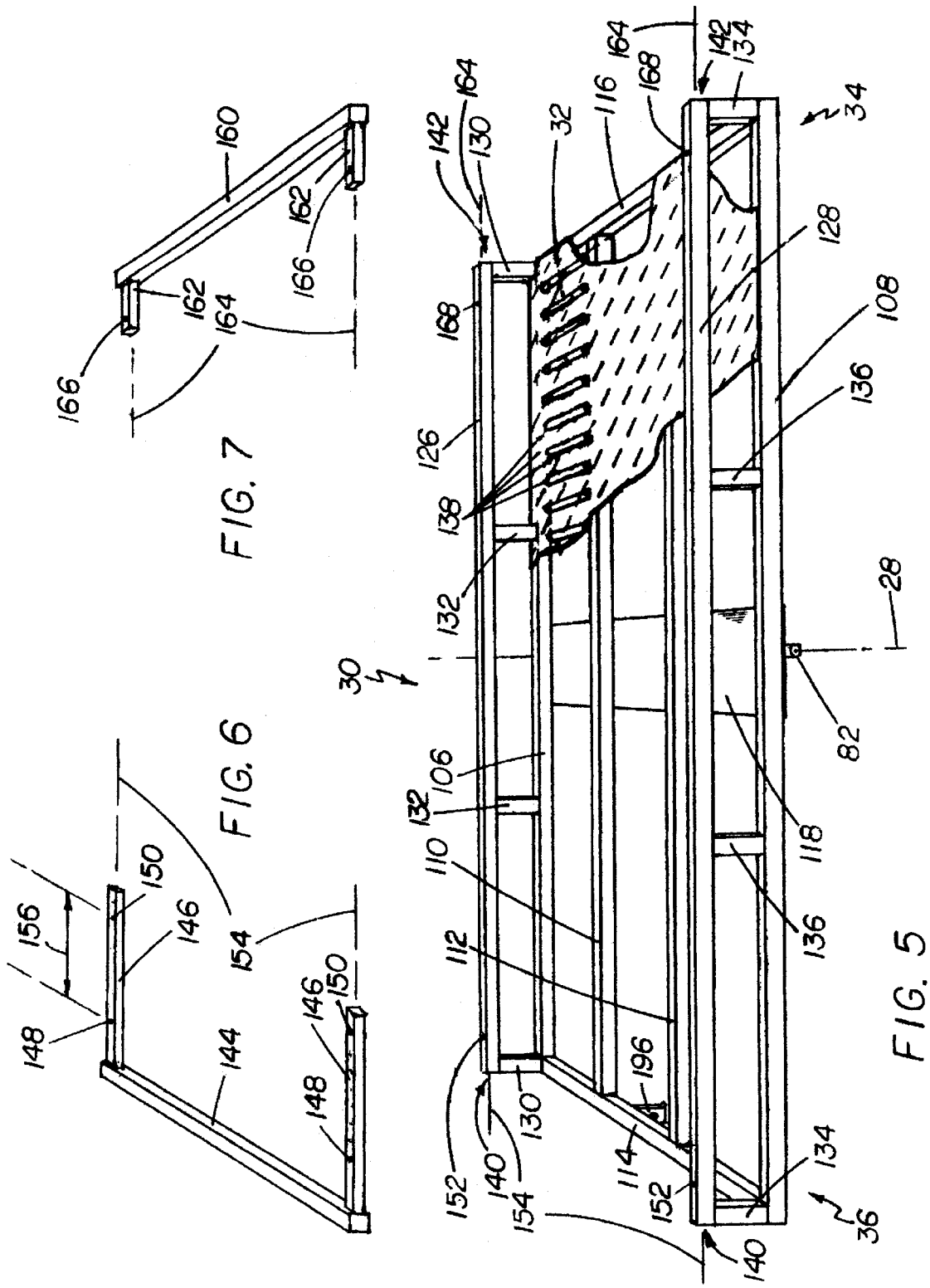

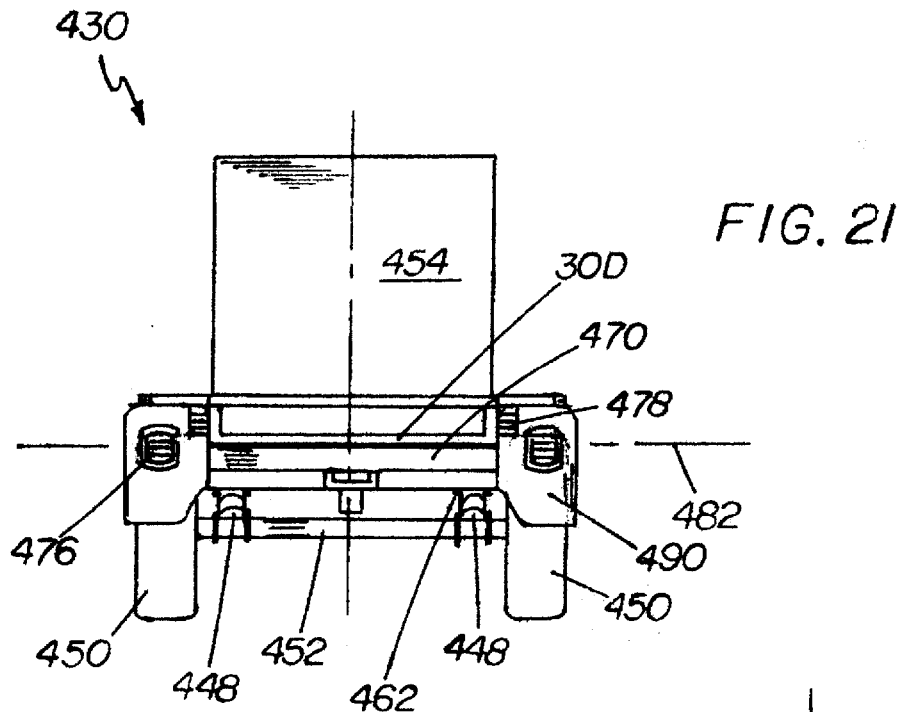
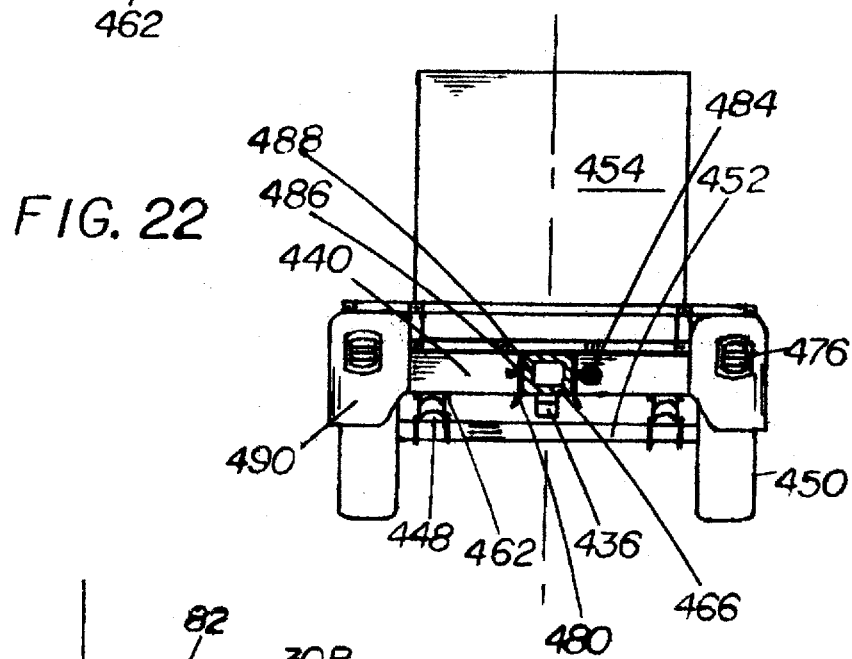
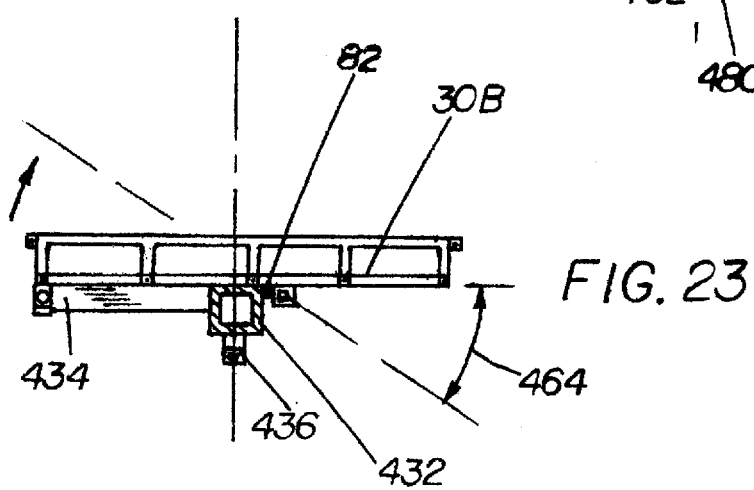

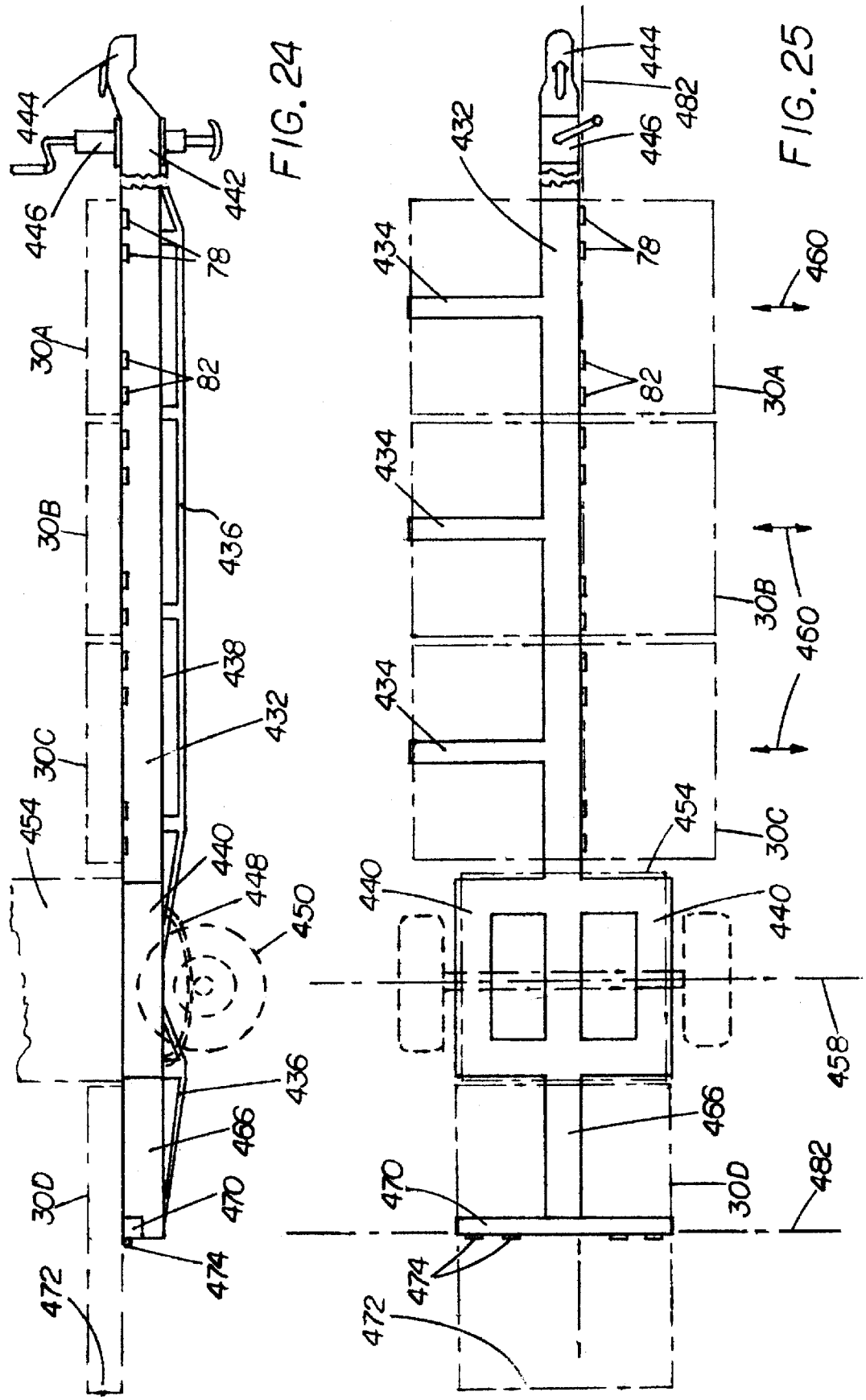

TILTABLE HAULING DEVICE

BACKGROUND OF THE INVENTION

1. Field of the Invention

This invention relates generally to attachments to vehicles. More particularly, the invention pertains to apparatus for attaching to automotive vehicles for transport of all-terrain recreational vehicles (ATVs), riding lawn mowers, motorcycles, bicycles, tools, and the like.

2. State of the Art

In the past 20 years, all-terrain vehicles (ATVs) having 3 or 4 "oversize" wheels have become commonly used in a wide variety of applications. For example, they are used by hunters and anglers to access remote sites, by ranchers to round up cattle, by racers, and by ATV enthusiasts to tour the mountains, forests, deserts and swamps. Generally, such an ATV may accommodate one or two persons. ATVs are even produced in small sizes, to be driven by children.

The proliferation of all-terrain vehicles has resulted in a need for equipment by which one or more ATVs may be easily and readily transported over relatively long distances, e.g. to an area conducive to off-road riding. Such areas are provided by the National Forests, Bureau of Land Management lands, and other public lands, for example. Often, a family or families enjoy riding ATVs together, necessitating the transport of three or more ATVs to the recreation site.

ATVs are commonly transported in a pickup truck or on a trailer. Full-size ATVs typically weigh between about 400 and 600 pounds (182 and 273 kg.) or more, one 4x4 model known as a Yamaha Grizzly weighing about 700 pounds in a travel-ready condition. 6x6 models having six wheels are now being marketed. Truck transport requires that a ramp also be carried in the truck bed to enable loading and unloading of the ATV(s). The space available for carrying other gear is greatly reduced.

Thus, a need exists for transporting one or more ATVs without taking up the bed space of a pickup truck, and permitting easy loading and unloading of an ATV or similar type vehicle.

A related need exists for the transport of gardening/lawn maintenance equipment such as riding mowers, garden tractors, etc. This need has become widespread particularly because of the proliferation of lawn and garden maintenance services as well as equipment rental companies. Like ATVs, riding mowers and garden tractors may weigh up to about 600 pounds (273 kg.) or more. Typically, however, the most popular sizes of riding mowers weigh about 400–550 pounds (182–250 kg.). Manual lifting of such a machine into a pickup truck or trailer can be hazardous, even by several persons, and virtually impossible for one person.

Various rigid carrying racks are shown in the prior art. Such racks may be attachable to the rear bumper, ball hitch or hitch receiver of a vehicle such as an automobile or pickup truck. Examples of such are shown in U.S. Pat. No. 4,394,947 of Tartaglia, U.S. Pat. No. 4,640,658 of Webb, Jr., U.S. Pat. No. 4,915,276 of Devito, U.S. Pat. No. 4,378,883 of Profeta, and U.S. Pat. No. 4,676,413 of Began et al. None of these references shows a carrier which may transport an ATV or riding mower.

In U.S. Pat. No. 4,635,835 of Cole, an apparatus is shown for mounting an all-terrain vehicle to a hitch receiver on the rear of an automobile. The axles of an ATV are attached to the apparatus and the front end of the ATV lifted by a person to a vertical position, where it is retained.

The lifting of an ATV, particularly one weighing up to about 600 pounds, will be very difficult in use of the Cole apparatus. A four-wheeler will be considerably heavier to lift than the three-wheeler shown. It may not be possible for one person to safely lift or lower the ATV as described without help. Persons who are physically handicapped will not be able to safely load or unload the ATV at all.

The Cole invention is inapplicable to the transport of riding mowers and the like, because of the very limited access to the rear axles of such mowers, and the relatively small mower wheels. In addition, the front ends of riding mowers are typically very heavy, making lifting additionally difficult, even if the axles could be accessed for attachment. The transport of riding mowers is not mentioned by Cole.

BRIEF SUMMARY OF THE INVENTION

The invention comprises an apparatus attachable to a Class IV hitch of a vehicle such as a pickup truck, heavy-duty van or other vehicle. The transport apparatus is particularly useful for hauling smaller off-road vehicles of two, three and four wheels, and riding lawn mowers, including such vehicles weighing up to about 600–700 pounds (273–318 kg.) or more. The apparatus has a carrying rack which is laterally tiltable to the ground level so that a small vehicle such as an ATV or riding mower may be driven onto a platform of the rack from the ground level, and driven in reverse from the platform for unloading. Thus, a vehicle such as an all-terrain vehicle (ATV) may be transported to and from an off-road recreation area without a trailer, and easily loaded and unloaded without the driver leaving the seat of the ATV. No lifting of the ATV or mower is required. Once on the rack, the weight of the small vehicle weights the rack to force it to an untilted, transport position. Other features of the invention are described, infra, by which the invention is shown to enable ease of operation, safety, convenience and other advantages for small vehicles of widely ranging sizes, weights, front-to-rear balance, wheel size, tire size, etc.

The apparatus of the invention may be used for transporting agricultural equipment such as riding mowers and small garden tractors.

In another aspect of the invention, a trailer is provided with one or more tiltable racks with platforms. Thus, a series of laterally tiltable platforms enable a plurality of e.g. ATVs or riding mowers to be loaded and unloaded under their own power, and without manual lifting. Permanently mounted storage containers may be an integral part of the trailer for transporting smaller equipment items, or for removal and disposal of grass cuttings, etc.

BRIEF DESCRIPTION OF THE DRAWINGS

The invention is illustrated in the following figures, wherein the elements are not necessarily shown to scale.

FIG. 2 is a top view of a frame of a tiltable transporting apparatus of the invention;

FIG. 3 is a right side view of a frame of a tiltable transporting apparatus of the invention;

FIG. 4 is a rear view of a frame of a tiltable transporting apparatus of the invention;

FIG. 5 is a partially cutaway top rear perspective view of a tiltable rack of a tiltable transporting apparatus of the invention;

FIG. 6 is a top rear perspective view of an end rail of a tiltable rack of the invention;

FIG. 7 is a top rear perspective view of an additional end rail of a tiltable rack of the invention;

FIG. 21 is a rear view of a trailer embodying tiltable carrying racks of the invention;

FIG. 22 is a rear cross-sectional view of a trailer embodying multiple tiltable carrying racks of the invention, as taken along line 22—22 of FIG. 20;

FIG. 23 is a rear cross-sectional view of a trailer embodying multiple tiltable carrying racks of the invention, as taken along line 23—23 of FIG. 20;

FIG. 24 is a right side view of a frame of a trailer for embodying multiple tiltable carrying racks of the invention; and FIG. 25 is a plan view of a frame of a trailer for embodying tiltable carrying racks of the invention.

DESCRIPTION OF THE ILLUSTRATED EMBODIMENTS

Figure 1:
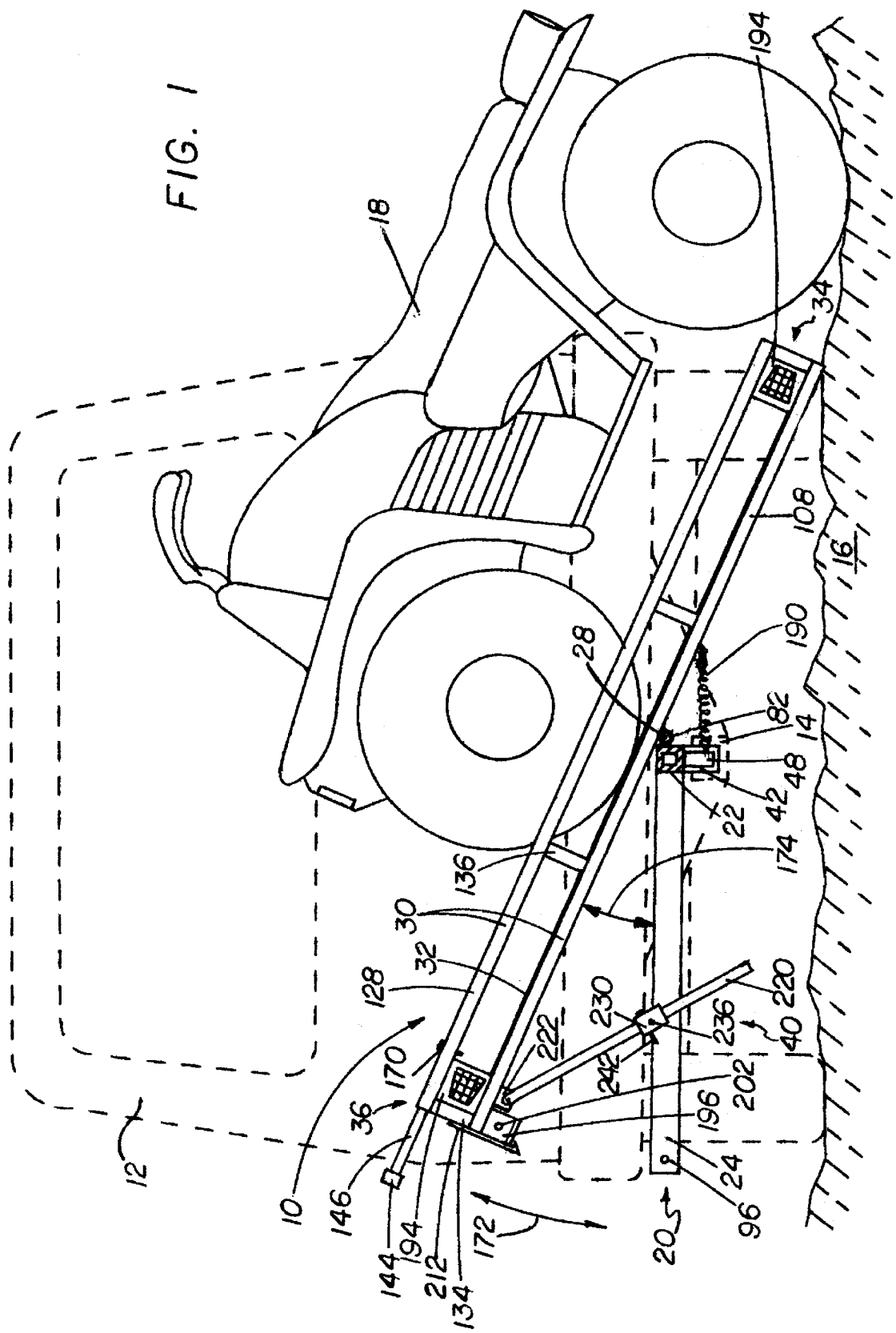
FIG. 1 is a rear view of a tiltable transporting apparatus of the invention, as attached to a hitch receiver of a motor vehicle, and having one end lowered for loading of an ATV thereonto.

Turning now to the figures, and particularly to FIG. 1, a transporting apparatus 10 for a vehicle is depicted as attached to a standard class 4 (or higher) hitch receiver 14 of a vehicle 12 such as a pickup truck, heavy duty van or other vehicle. This particular embodiment is totally supported by the hitch receiver 14 and does not touch the ground 16 during transport. The figure shows an all-terrain vehicle (ATV) 18 partially loaded onto the apparatus 10.

In the following discussion, it should be noted that terms such as "front", "rear", "left" and "right" are in reference to the normal forward travel direction of the host vehicle.

The tiltable transporting apparatus 10 is comprised of three major assemblies:

a. a frame 20 constructed of pieces of square tubing which are welded together to form a singular frame member 22 with a transverse stringer or outrigger 24 welded to it. The front end 26 of the singular longitudinal frame member 22 comprises a hitch tongue for lockable insertion into a standard class 4 (or greater) hitch receiver 14;

b. a carrying rack 30 is hingedly attached to the longitudinal frame member 22 so that it may be tilted about a generally central front-to-rear axis 28. One side 34 tilts downwardly to the ground 16 for loading and unloading an ATV 18, other small vehicle, or other gear; side 34 shall be identified as the loading side in this description. Opposite the loading side 34 is a non-loading side 36 which does not tilt downward toward the ground 16 but is supported by transverse outrigger 24.

c. a sliding bar device 40 for locking the carrying rack 30 in a desired position.

Each of these assemblies 20, 30 and 40 is described in detail, infra, together with descriptions of other features which may be optionally or of necessity incorporated into the various embodiments of the apparatus.

Looking now at FIGS. 1 through 4, the singular longitudinal frame member 22 of frame 20 is shown as formed of steel square tubing such as 2 inch (5.08 cm) tubing with 0.25 inch (0.635 cm) walls. A double bend is formed in the frame member 22 by welding a downwardly-angled dive section 42 between a rear section 44 and a tongue 26, the latter two being generally parallel. Weld-lines 52 and 54 are shown in FIGS. 2–4. The angle 38 between the dive section 42 and the rear section 44 may be between about 5 and 90 degrees but is preferably between about 30 and 60 degrees. The angle 38 and length 68 of the dive section 42 may be varied to compensate for differing elevations of hitch receivers 14. For example, a larger vehicle 14 will often have its hitch receiver 14 at a higher elevation. The transporting apparatus 10 desirably must have sufficient clearance to avoid ground contact during transport over rough terrain, but should not be at an elevation so high that loading and unloading are more difficult.

A front reinforcement gusset 46 joins the upper surface 56 of the tongue 26 and the upper surface 58 of the dive section 42. Likewise, a rear reinforcement gusset 48 joins the lower surface 60 of the dive section 42 to the lower surface 62 of the rear section 44. The formed frame structure 20 is very strong and readily supports the high loads exerted by e.g. ATVs transported over extremely rough four-wheel-drive (4WD) roads. The gussets 46, 48 are shown in FIGS. 1–4 as square tubing of smaller sizes but may also be formed of metal plate (see FIG. 10 for example).

The length 70 of the tongue 26 is sufficient to achieve ready insertion and locking within a class 4 hitch receiver.

The end 50 of tongue 26 has a hole 64 therethrough for locking the tongue within the hitch receiver 14. A locking pin 66 may be attached to a chain or cable 74 which is fixed to the tongue 26, dive section 42 or front gusset 46. Thus, the locking pin 66 cannot be lost. As will be seen in the following description, the use of locking pins throughout the invention is enhanced by permanent attachment of the pins to the apparatus by chains or cables in order to avoid loss, particularly in semi-wilderness areas such as are used by ATV enthusiasts.

The rear section 44 extends from its rear end 76 to the weld joint 54 with the dive section 42 and has a length 72. The rear section 44 is configured to centrally support a carrying rack 30 by the use of two sets of hinges. As will be discussed infra, each set of hinges has several hinge portions joined by a hinge pin, with alternate hinge portions joined to the rack 30 or to the singular frame member 22.

Extending transversely at a generally right angle from the rear section 44 is a stinger or outrigger 24 shown as comprising a straight section of square tubing. The outrigger 24 has its inner end 88 welded to the rear section 44 and generally centrally supports one side of a carrying rack 30, permitting the rack to be locked in a level (transporting) position or a tilted (loading/unloading) position. The length 86 of the outrigger 24 from its inner end 88 to its outer end 90 is roughly ½ of the total width of a carrying rack 30. The distance 92 from the rear end 76 to the outrigger 24 is about ½ of the front-to-rear dimension 94 of a carrying rack 30. As will be noted in more detail, a hole 96 is used for locking a carrying rack 30 in a non-tilted position.

Turning now to viewing FIG. 5 in conjunction with FIG. 1, a carrying rack 30 is depicted having a bottom frame comprising front rack member 106, rear rack member 108, front crosspiece 110 and rear crosspiece 112. Members 106 and 108 and crosspieces 110 and 112 are joined at the left side by left member 114, at the right side by right member 116 and generally centrally by central plate 118. The central plate 118 provides rigidity to the rack 30, and overlies the hinges 80 and 84, preventing dirt, rocks, etc. from falling on the hinges and the frame member 22.

Although not shown in the drawings, it is understood that optional reinforcement gussets may be welded to the undersides of front and rear members 106, 108 and/or crosspieces 110, 112 of the loading/unloading side 34 of the rack 30. The optional gussets 120 may abut a central tube which is axially attached to the rack 30 beneath the central plate 118. The gussets and central tube are not required to achieve the strength for carrying anticipated loads.

Figure 10:
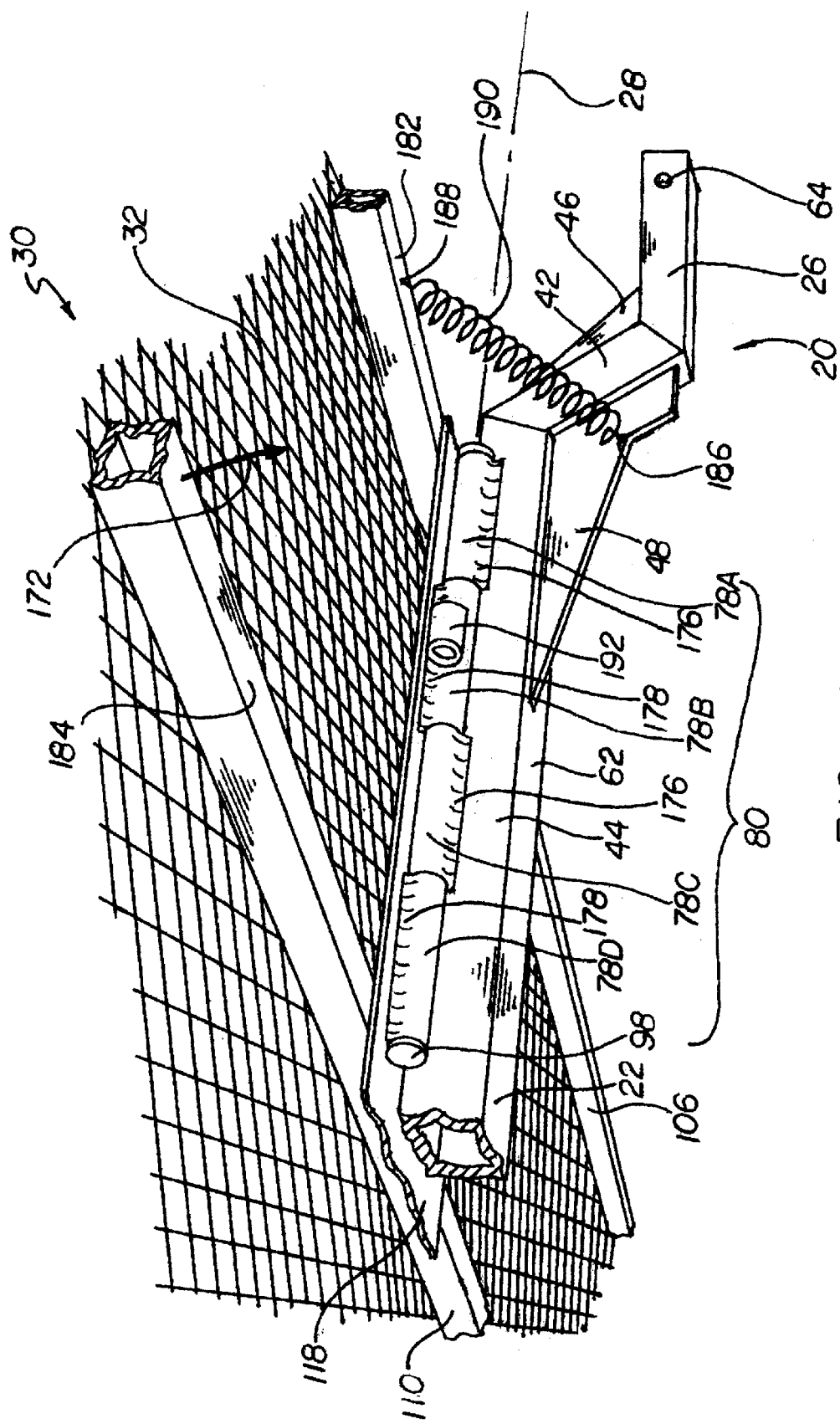
FIG. 10 is a partial perspective view of a hinge portion of a tiltable transporting apparatus of the invention.
Figure 11:
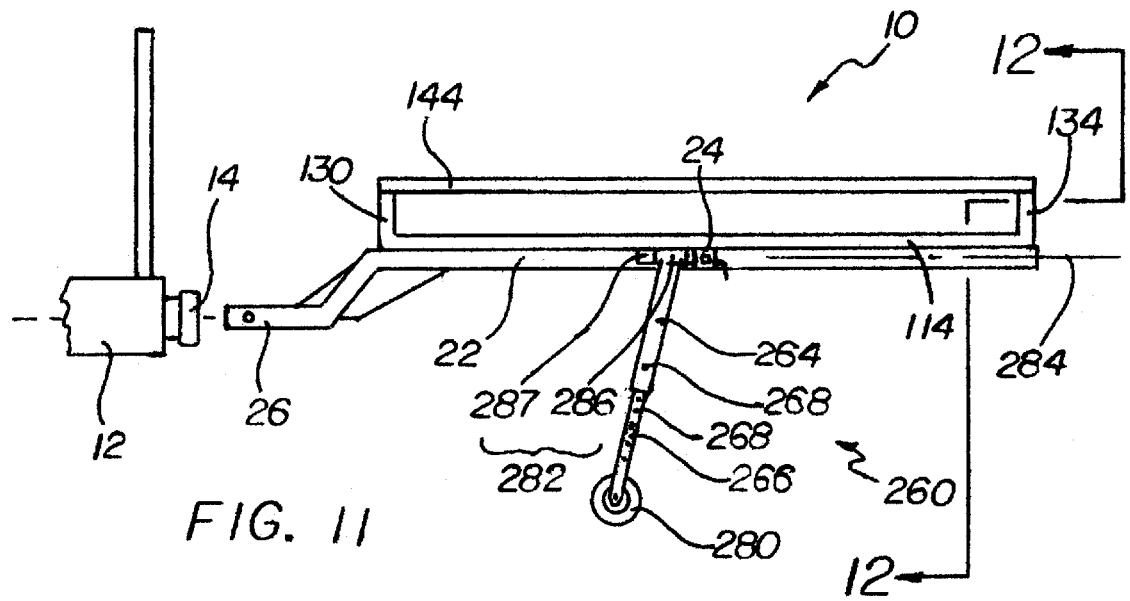
FIG. 11 is a left side view of a tiltable transporting apparatus of the invention with a fold-up bogey wheel in a lowered ground-contact position for maneuvering the transporting apparatus to the hitch receiver of a vehicle.
Figure 12:
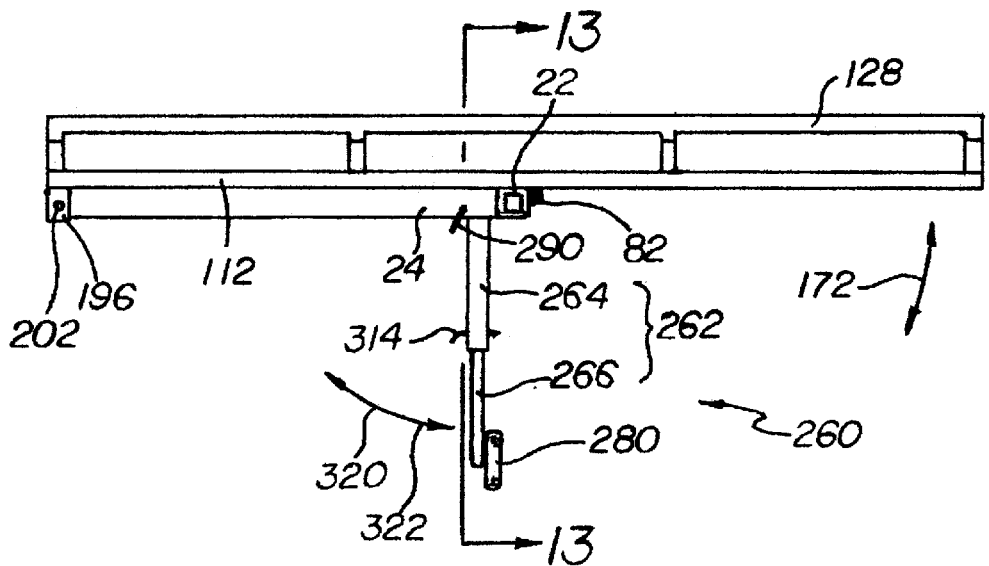
FIG. 12 is a rear view of a tiltable transporting apparatus of the invention with a fold-up bogey wheel in a lowered ground-contact position for maneuvering the transporting apparatus to the hitch receiver of a vehicle, as taken along line 12—12 of FIG. 11.

An embodiment of the rack 30 is illustrated in FIGS. 10 and 11, and is a preferred embodiment of the invention.

In FIGS. 1 and 5, a platform 32 is shown welded to the rack framework 124 and preferably comprises a layer of non-rolled expanded steel, e.g. ¾ inch flat #9 expanded metal. This well-known material has projections which enable the tires of a small vehicle to grip the surface and climb a relatively steep incline. Generally, an ATV tire has projecting treads which enable it to climb even a flat rolled expanded metal, but riding mowers typically use tires with much less projecting tread. Where a flat (rolled) expanded steel platform 32 is to be used with riding mowers, the tire grip may be enhanced by welding a series of spaced narrow steel gripping bars 138 to tire contact areas on the platform 32. Bars 138 preferably have a triangular cross-section.

A front rail 126 is upwardly supported above the front rack member 106 by end posts 130 and intermediate posts 132. Likewise, a rear rail 128 is supported above the rear rack member 108 by end posts 134 and intermediate posts 136. The rails 126, 128 are positioned about 5 to 12 inches above the front and rear rack members 106, 108.

Being formed of square tubing, the front and rear rails 126, 128 have open ends 140, 142 into which square stock of a smaller size may be inserted. As shown in FIG. 6, a first side rail 144 formed of square tubing has legs 146 attached at each end. The legs 146 are of a smaller size square stock for insertion along lines 154 into the open ends 140 at the non-loading sides 36 of the front and rear rails 126, 128. Square stock of ⅝ inch (1.5875 cm) will fit into 1.0 inch (2.54 cm) square tubing with ⅛ inch (0.3175 cm) thick walls. Vertical holes 148 in the legs 146 may be aligned with holes 152 in the front and rear rails 126, 128 and locking pins 170 (see FIG. 1) inserted to maintain the first side rail 144 in a closed position. In an alternative extended position, the pins are inserted through holes 150 and 152 so that the first side rail extends leftwardly from the rack 30 an extension distance 156, as illustrated in FIG. 1. This feature is particularly useful for loading a three-wheel ATV or other vehicle with a less weighty front end onto the rack 30. Such vehicles are particularly unbalanced between front and rear axles when the weight of a rider is added, and it may be necessary to ride the vehicle 18 further toward the non-loading side 36 to weight the non-loading side and force it to tilt downwardly to a supported position on the outrigger 24. The extension feature provides the necessary distance 156. With the first side rail 144 locked in an extended position, the vehicle 18 may be driven further onto the rack 30.

As shown in FIG. 7, a second side rail 160 formed of square tubing has legs 162 attached at each end. The legs 162 are of a smaller size square stock for insertion along lines 164 into the open ends 142 at the loading sides 34 of the front and rear rails 126, 128. A vertical hole 166 in each leg 162 may be aligned with a hole 168 in the front and rear rails 126, 128 and locking pins (not shown) inserted to maintain the second side rail 160 in a closed position. Each leg 162 has a hole 166 for locking the second side rail 160 to the rack.

For the sake of safety, the ATV 18 or other item carried on the transporting apparatus 10 may be tightly secured by rope or straps, not shown, to any of the front and rear rails 126, 128, the intermediate posts 132, 136, the end posts 130, 134 and the removable side rails 144 and 160. It is seen that the vehicle 18 may be secured in all three axes to the securing locations which encircle the loaded vehicle 18.

As shown particularly in FIGS. 1–4, 8 and 10, front and rear hinge sections 78 and 82 comprise round tubing or pipe which is cut into short pieces such as 4 inches in length. Each hinge section 78 is welded to the frame member 22 or to the carrying rack 30 in an alternating pattern. In the example shown in FIG. 8, a front hinge 80 includes 2 front hinge sections 78 attached to the frame member 22 and 2 front hinge sections 78 attached to the overlying rack 30. A rear hinge 84 includes 2 rear hinge sections 82 attached to the frame member 22 and 2 rear hinge sections 82 attached to the overlying rack 30. The hinge sections 78 are joined along axis 28 by moving the frame member 22 in direction 102. An elongate hinge rod 98 is inserted therein along line 100 to form a front hinge 80. Likewise, hinge sections 82 are joined along axis 28 and a hinge rod inserted, forming a rear hinge 84. In a preferred embodiment, the front hinge 80 is located between the front rack member 106 and the front crosspiece 110. Likewise, the rear hinge 84 is located between the rear rack member 108 and the rear crosspiece 112.

As shown in FIG. 1, the carrying rack 30 tilts in direction 172 about axis 28 through coaxial hinges 80 and 82, up to a tilt angle 174 of about 45 degrees.

As described above, the major members of the carrying rack 30 comprise e.g. welded pieces of 1.0 inch (2.54 cm)

square steel tubing with ⅛ inch (0.3175 cm) thick walls. Although tubing of larger size may be used, the capacity of such a high strength carrying rack 30 will unnecessarily far exceed the capacity of a class 4 hitch receiver. Of course, the stronger rack 30 may be useful in combination with a hitch receiver 14 having a capacity greater than a standard class 4 receiver.

Turning now to FIG. 10, the underside of the front portion of a carrying rack 30 and the underlying support frame 20 are shown. The carrying rack 30 is shown with front rack member 106, front crosspiece 110, and a platform 32 of expanded metal. A central plate 118 is welded to the undersides 182 of the front and rear rack members 106, 108 and the undersides 184 of the crosspieces 110, 112. The tongue 26, dive section 42 and rear section 44 of the frame 20 are depicted with plate gussets 46 and 48 welded to them for added strength. Four hinge sections 78A, 78B, 78C and 78D comprising a front hinge 80 are shown. Hinge sections 78A and 78C are joined by weldments 176 to the side 180 of the straight rear section 44 of the singular frame member 22. The alternate hinge sections 78B and 78D are joined by weldments 178 to the central plate 118. An elongate hinge pin 98 is passed through all of the hinge sections in the front hinge 80 for tiltably supporting the rack 30.

Also shown in FIGS. 1 and 10 is a counter-spring 190 which is attached between the frame 20 and the rack 30. As shown, the spring 190 is attached through a hole 186 in gusset 48 and a hole 188 in the underside 182 of the front rack member 106. The spring 190 partially biases the carrying rack 30 to a tilted position, so that the tilted position will be retained without locking, while driving a small vehicle 18 onto the rack. When the vehicle 18 is driven up onto the rack 30 to a point where it weights the non-loading side 36, the non-loading side of the rack will drop to the outrigger 24. The spring 190, shown as a coil spring, is chosen so that in a fully expanded position, i.e. a non-tilted rack 30, the spring exerts about 60 to about 70 pounds (about 27.3 to 31.8 kg.) of vertically downward directed force, and when in the contracted position, i.e. a rack tilted to ground level, the spring exerts about 50 to 60 pounds (about 22.7 to 27.3 kg.) of vertically downward directed force. These criteria provide for sufficient loading bias, although higher forces may be used if desired. A spring force is selected to ensure that the rack is biased to a tilted position, but not so high as to prevent return of the rack to a transport position when a small vehicle is driven onto the rack.

While the transporting apparatus 10 may be used without a spring 190 or other biasing device, ease of operation is enhanced by its incorporation into the apparatus.

Also shown in FIG. 10 is a wire retainer 192 through which wires from taillights (FIG. 1) may be directed to the front of the transporting apparatus 10 for connection to the light system of the host vehicle 12. Several wire retainers 192 may be welded to the underside of the rack 30 or to the frame 20 for holding the wires (not shown) in a protected path.

Figure 9:
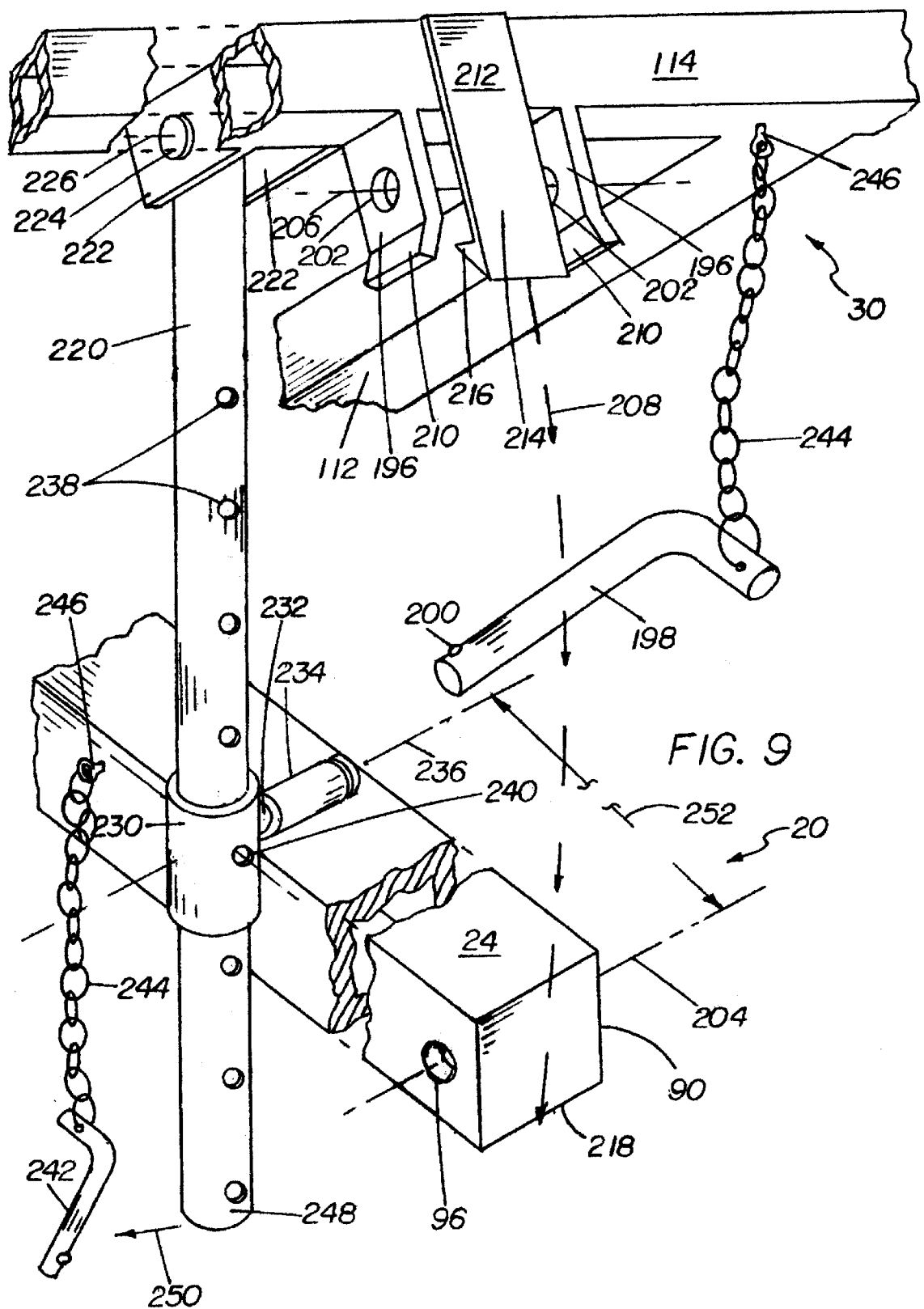
FIG. 9 is a partial perspective view of a latching portion of a tiltable rack and outrigger member of a transporting apparatus of the invention.

FIGS. 1 and 9 depict a portion of the non-loading side of a carrying rack 30 and the outer end 90 of the outrigger 24 of the frame 20. The rack 30 is shown in a tilted position relative to the frame 20. A portion of the left rack member 114 directly above the outrigger 24 is shown with attached rear cross-piece 112. The outer end 90 of the outrigger 24 has a horizontal hole 96 therethrough for passage of a locking pin 198. Mounted on member 114 is a pair of downwardly extending ears 196 shown with holes 202 centered along axis 206 and having flared ends 210 for ease of positioning on the outer end 90 of the outrigger 24. When the left rack member 114 is moved downwardly along line 208 to abut the outrigger 24, ears 196 pass on each side of the outrigger 24 and the holes 202 and 96 become aligned along line 204 for passage of the locking pin 198.

Also shown in FIG. 9 is a safety latch 212 fixed to the left rack member 114. The safety latch 212 comprises a flexible plate 214 with a hook end portion 216. When the left rack member 114 is moved downward along line 208 to engage the outrigger 24, the safety latch 212 resiliently slides over the end 90 of the outrigger and its hook end portion 216 snaps under the outrigger along edge 218 to temporarily hold the rack 30 in a horizontal position. For travel, pin 198 is inserted and locked in aligned holes 202 and 96. Pin 198 is shown with a press-in ball 200 for retaining the pin within a locking position. Of course, a wide variety of lock pin types is available and may be alternatively used.

FIG. 9 also shows a sliding bar lock 40 by which the rack 30 may be locked in a plurality of positions including fully tilted and fully un-tilted. A sliding lock bar 220 formed of pipe or tubing is pivotably mounted between a second pair 222 of ears fixed to left rack member 114. The lock bar 220 is shown as rotatable about pin 224 along axis 226. A sleeve 230 has a cylindrical rod 232 welded to it at a right angle. The rod 232 passes through a bearing member 234 welded to the outrigger 24, such that the sleeve 230 may rotate freely about axis 236. The sleeve 230 is configured for sliding passage of the lock bar 220 therethrough. Spaced holes 238 along the length of the sliding lock bar 220 match holes 240 in the sleeve 230, for placement of a locking pin 242 therethrough to lock the sliding lock bar at one of a plurality of positions. Each of locking pins 198 and 242 is shown as attached by a chain 244 and fitting 246 to the apparatus 10 to be readily available for use, without the likelihood of loss.

The distance 252 between axis 204 and axis 236 is set so that as the left rack member 114 is lowered along line 208, the free end 248 of the sliding lock bar 220 moves in direction 250 to become nearly parallel to the outrigger 24.

Although the weight of a complete transporting apparatus 10 may be less than about 160 pounds (73 kg.), it may be difficult for one person to insert the tongue 26 of an unconnected apparatus 10 into a hitch receiver 14 mounted on motor vehicle 12. As shown in FIGS. 11–15, a fold-up wheel assembly 260 may be provided for enabling a person to manually move the apparatus 10 like a wheelbarrow, using the rear rail 128 as a maneuvering handle.

The fold-up wheel assembly 260 includes a telescoping strut 262 comprising an upper leg 264 of e.g. 1.25 inch (3.175 cm.) square tubing and a lower leg 266 of e.g. 1.0 inch (2.54 cm.) square tubing which may slide within the upper leg. The lower leg 266 and upper leg have matching holes 268, by which they may be bolted together by a fastener 314 at a desired overall strut length dependent upon the ground clearance 272 of the transporting apparatus 10 when hitched to the host transporting vehicle 12. The upper leg 264 is pivotably attached by a wheel assembly hinge 282 to the singular frame member 22, preferably forward of the outrigger 24.

Figure 13:
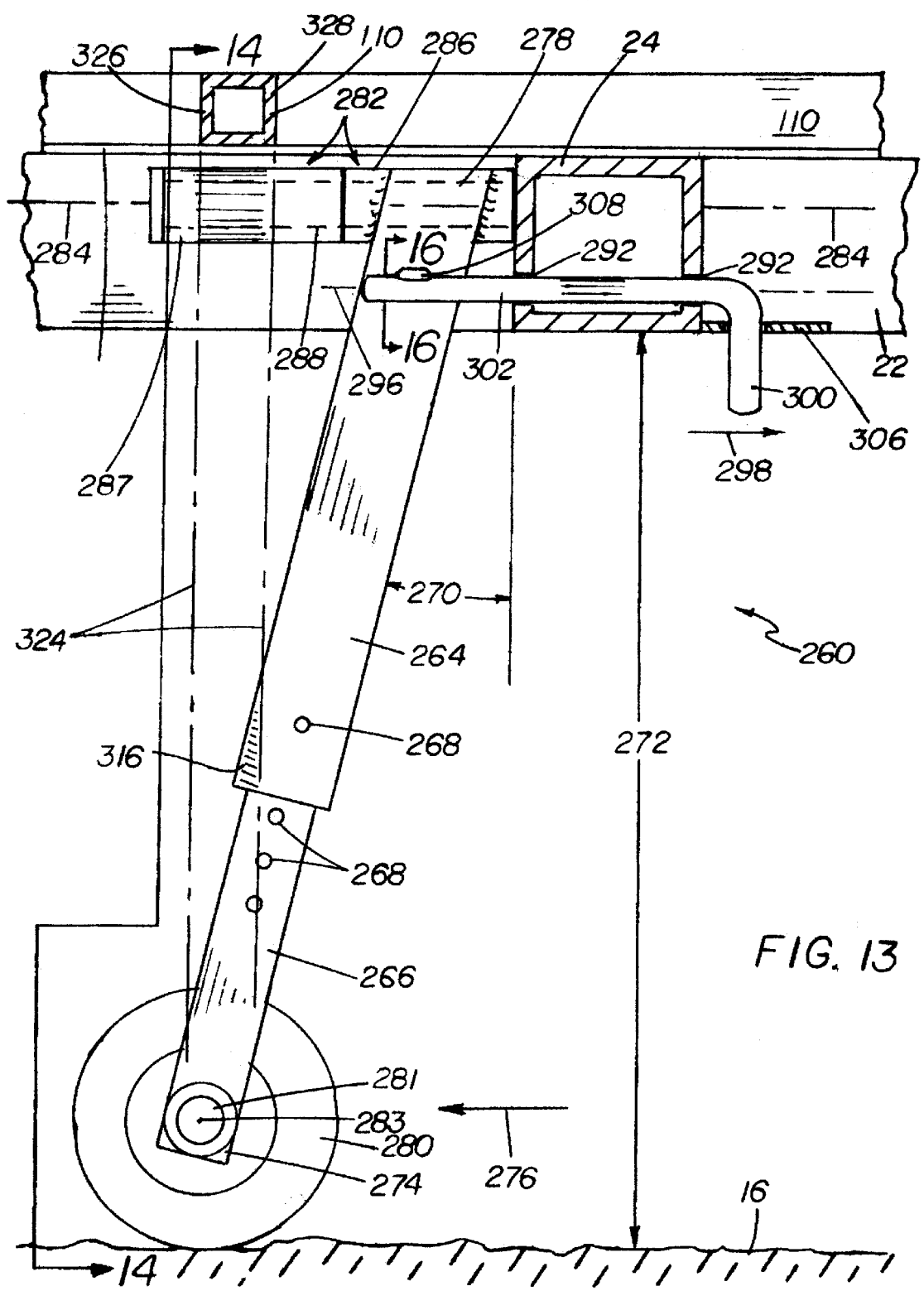
FIG. 13 is an enlarged left side view of a fold-up bogey wheel assembly mounted on the frame of a tiltable transporting apparatus of the invention and locked in a lowered position, as taken along line 13—13 of FIG. 12.

A wheel 280 is mounted by axle 281 on the lower end 274 of the lower leg 266 for rolling on the ground 16 in the forward direction 276 about axis 283. The two-section strut 262 is mounted at a forward angle 270 of between about 0 and 25 degrees from the vertical. More preferably, angle 270 is between about 10 and 20 degrees. The forward angling achieves several purposes. First, maneuvering the unhitched transporting apparatus 10 is easier when a major portion of its weight is rearward of the wheel 280. The rail 128 by which a person maneuvers the apparatus 10 will generally be about hip-high, and it is easier for a person to controllably support a downwardly weighted rail 128 than to move the apparatus while pushing downwardly on the rail. Another purpose of the angled strut 262 is to position a portion 316 of the upper leg 264 vertically beneath the front crosspiece 110 of the carrying rack 30 so that when the strut 262 is placed in an upper, retracted position, any further upward movement by the strut 262 is prevented by engagement with the locked front crosspiece. This is illustrated in FIG. 13, where a portion 316 lies within lines 324 downwardly projected from the front and rear sides 326, 328 of the front crosspiece 110.

The upper end 278 of the upper leg 264 is joined to a piece of round tubing or pipe 286. A wheel assembly hinge 282 is formed of the pipe 286, an axially mating pipe piece 287 welded to the frame member 22, and a shaft 288 passing through pieces 286 and 287. The legs 264, 266 and wheel 280 may be pivoted about a forwardly directed axis 284 passing through shaft 288. Thus, the fold-up wheel assembly 260 may be pivoted upwardly in direction 320 to a retracted upper position (FIG. 15) and downwardly in direction 322 to a down position (FIGS. 11–14) for wheel contact with the ground 16. The wheel assembly hinge 282 is preferably positioned just forward of the outrigger 24. As already indicated, the wheel 280 is preferably positioned somewhat forward of the wheel assembly hinge 282 in order to place a majority of the apparatus weight rearward of the wheel 280. This position enables ease of manually controlling movement of the apparatus 10 in all directions for insertion and removal of the tongue 26 into/from the hitch receiver 14.

As shown, the wheel assembly 260 is held in an upright position for maneuvering the apparatus 10. The inner side 330 of the upper leg 264 abuts the non-loading side 332 of frame member 22, preventing movement of the upper leg in one direction. In addition, the outer side 334 of the upper leg 264 is held in place by a lock pin 290 which is both slidable and rotatable.

Figure 14:
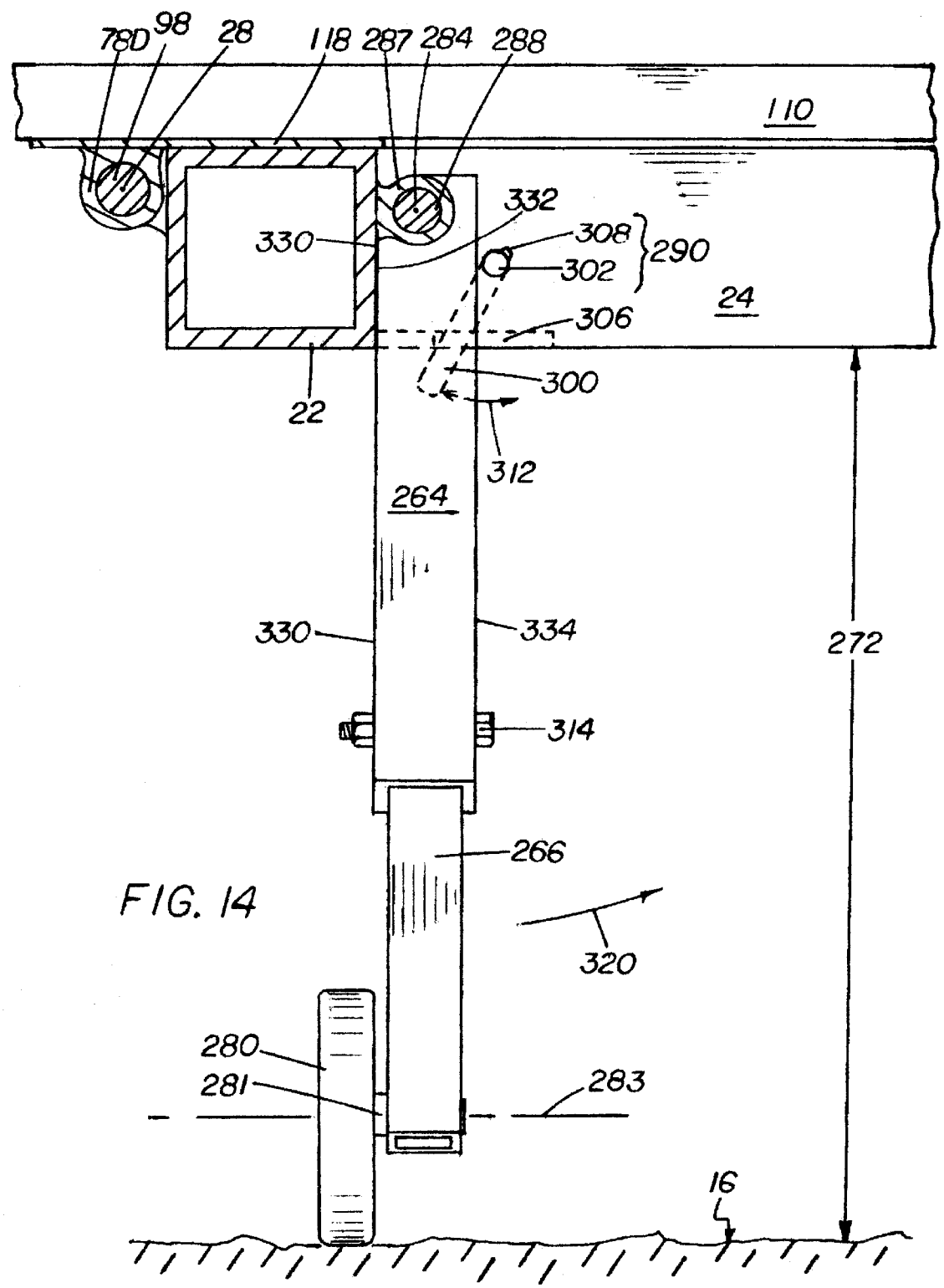
FIG. 14 is an enlarged frontal view of a fold-up bogey wheel assembly mounted on the frame of a tiltable transporting apparatus of the invention and locked in a lowered position, as taken along line 14—14 of FIG. 13.

A locking mechanism is provided for retaining the wheel assembly 260 in either a down position or a retracted i.e. folded-up position. As seen in FIGS. 13 and 14, lock pin 290 is mounted in holes 292 through the outrigger 24, and has a shaft 302 and handle 300. The pin handle 300 is generally normal to the shaft 302, and in a forward-most position shown in FIG. 13, the handle 300 may be dropped into a slotted handle retainer 306. In this forward-most position, the lock pin 290 extends across the upper leg 264 to retain it in either a down (rolling) position or retracted up position; movement of the wheel assembly 260 along lines 320, 322 between the up and down positions is permitted when the lock pin 290 is pivoted out of the slotted handle retainer 306 and retracted axially rearwardly 298. Thus, the lock pin 290 may be both pivoted in directions 312 and moved axially in direction 298 within the holes 292. Axial movement of the pin 290 is prevented when the pin handle 300 is within the slotted handle retainer 306. As will be further described with respect to FIGS. 15 and 16, a feature of the lock pin 290 is such that pivotal movement of the pin shaft 302 requires that the carrying rack 30 be unlocked from its transport position and be tilted to a predetermined but limited angle 304 in order to pivot the wheel assembly 260 from a retracted position.

Figure 15:
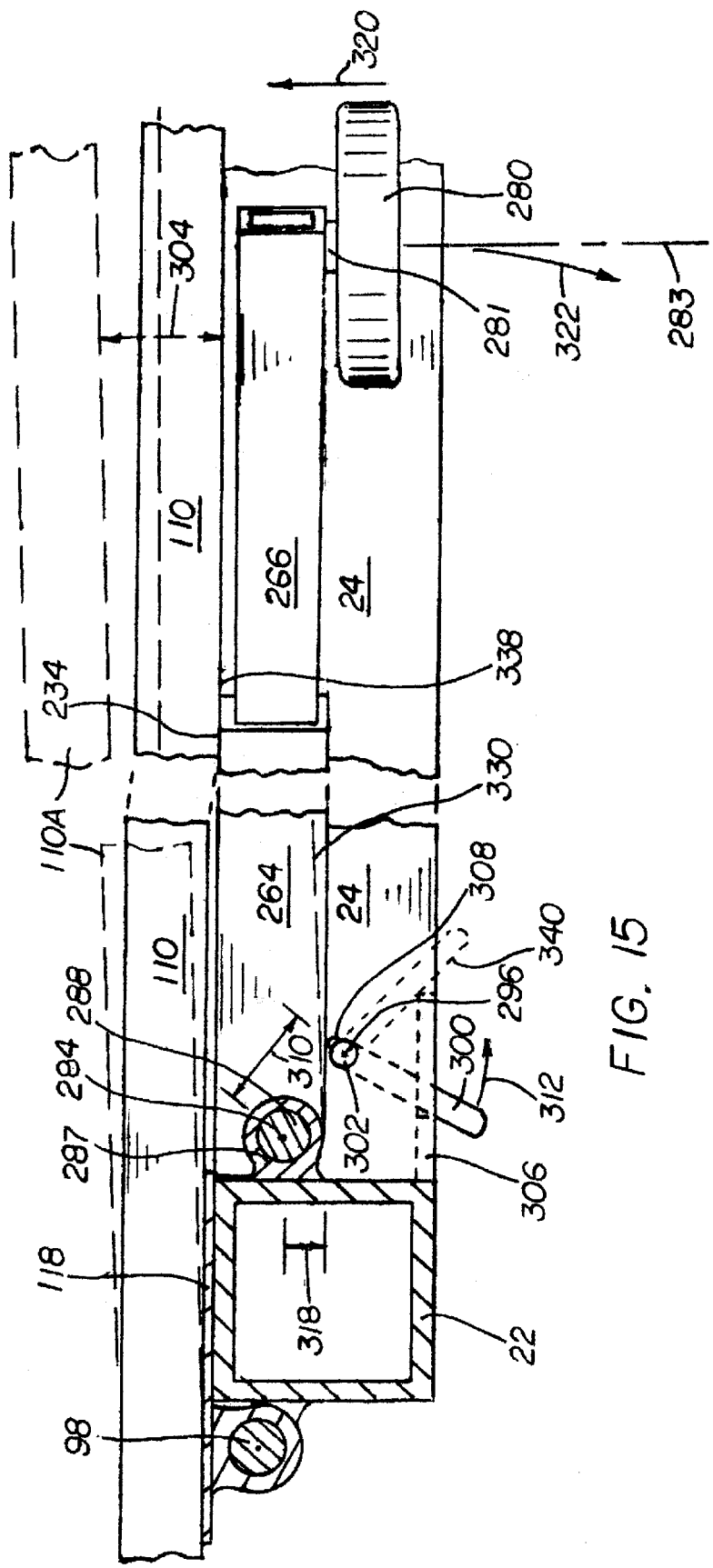
FIG. 15 is an enlarged frontal view of a fold-up bogey wheel assembly mounted on the frame of a tiltable transporting apparatus of the invention and locked in a retracted position.
Figure 8:
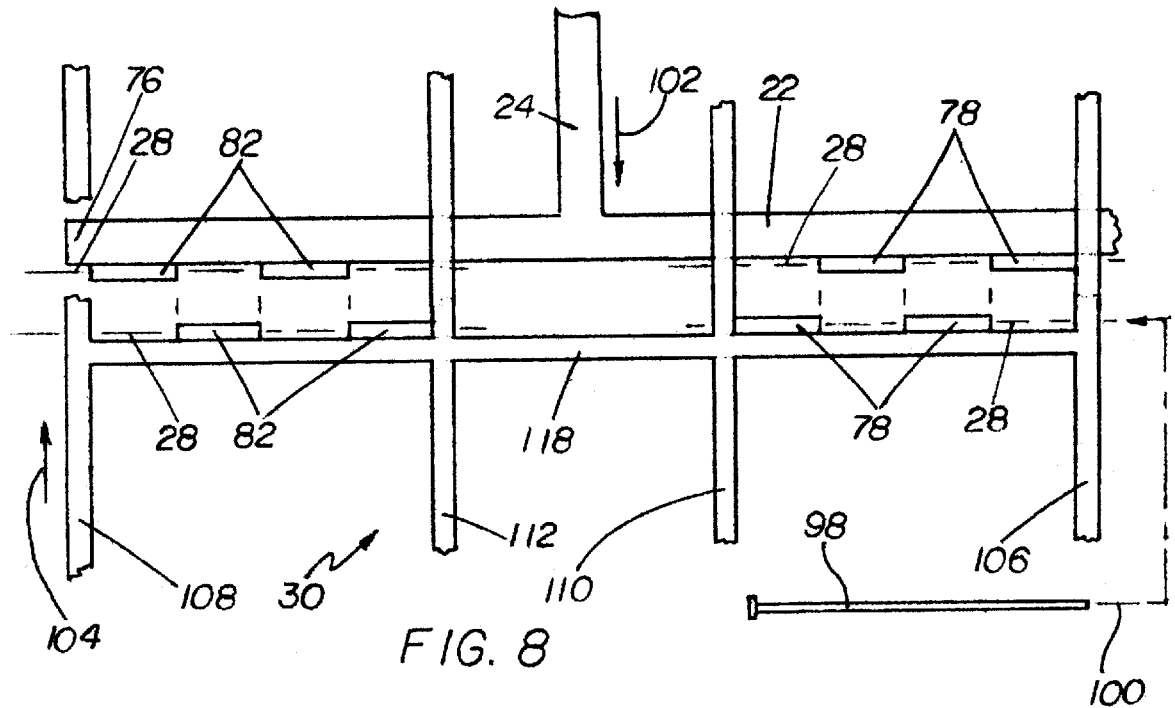
FIG. 8 is an exploded top view of a hinge connecting a tiltable rack and a frame of the invention.
Figure 16:
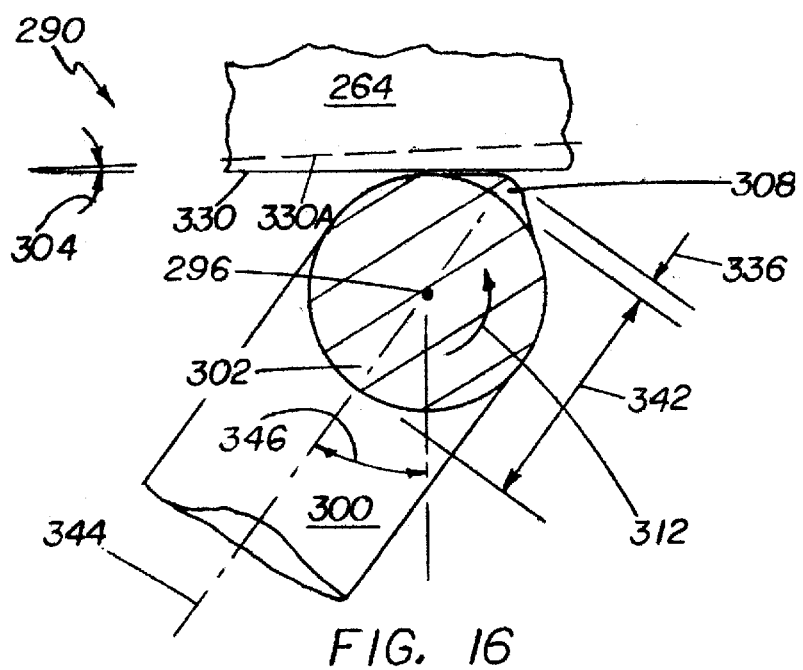
FIG. 16 is an enlarged cross-sectional front view of a wheel assembly lock pin of the invention, as taken along line 16—16 of FIG. 13.

Looking now at FIG. 15, the shaft 302 of the lock pin 290 has a radial projection or node 308 which engages the inner side 330 of the upper leg 264 during pin handle rotation 312 outwardly from the handle retainer 306. Unless the upper leg 264 is pivoted upward to the predetermined release angle 304, i.e. away from the pin 290, the node 308 cannot rotate past the upper leg, and thus the pin handle 300 cannot become retracted from the handle retainer 306. When the rack 30 is locked to the outrigger 24 in a transport position, its lower surface 338 is abutted by the outer side 234 of the upper leg 264 of retracted wheel assembly 260, preventing further upward movement thereof. Thus, the wheel assembly 260 is locked in its retracted position and cannot become released without unlocking and raising of the carrying rack 30. As shown in FIGS. 15 and 16, the required release angle 304 depends upon the distance 310 from axis 284 to the pin axis 296, as well as the distance 318 between axis 284 and upper leg side 330, and node height 336 shown in FIG. 16. For example, the release angle is typically about 3 to 10 degrees, and permits outward rotation 312 of the lock pin handle 300 to a position 340 free of the slotted handle retainer 306. Unless the rack 30 is pivoted upwardly to a position 330A, contact with the upper leg 264 prevents further rotation of the lock pin 290, and this prevents removal of the lock pin handle 300 from the retainer 306. The lock pin 290 is shown with shaft diameter 342 and having a node 308 positioned in a central plane 344 of the lock pin. A particular angle 346 from the vertical becomes the fully locked handle angle and may be designed for full penetration of the lock pin handle 300 into the slotted handle retainer 306. The particular dimensions and angles may be varied, depending upon the desired node height 336, configuration of the handle retainer 336, etc.

It is evident that the wheel assembly hinge 282 may be fixed to the frame 20 or carrying rack 30 at other locations. However, the locking mechanism for reliably locking the wheel assembly 260 in a retracted position is not available at most potential locations, and a preferred embodiment thereof has been described.

Figure 17:
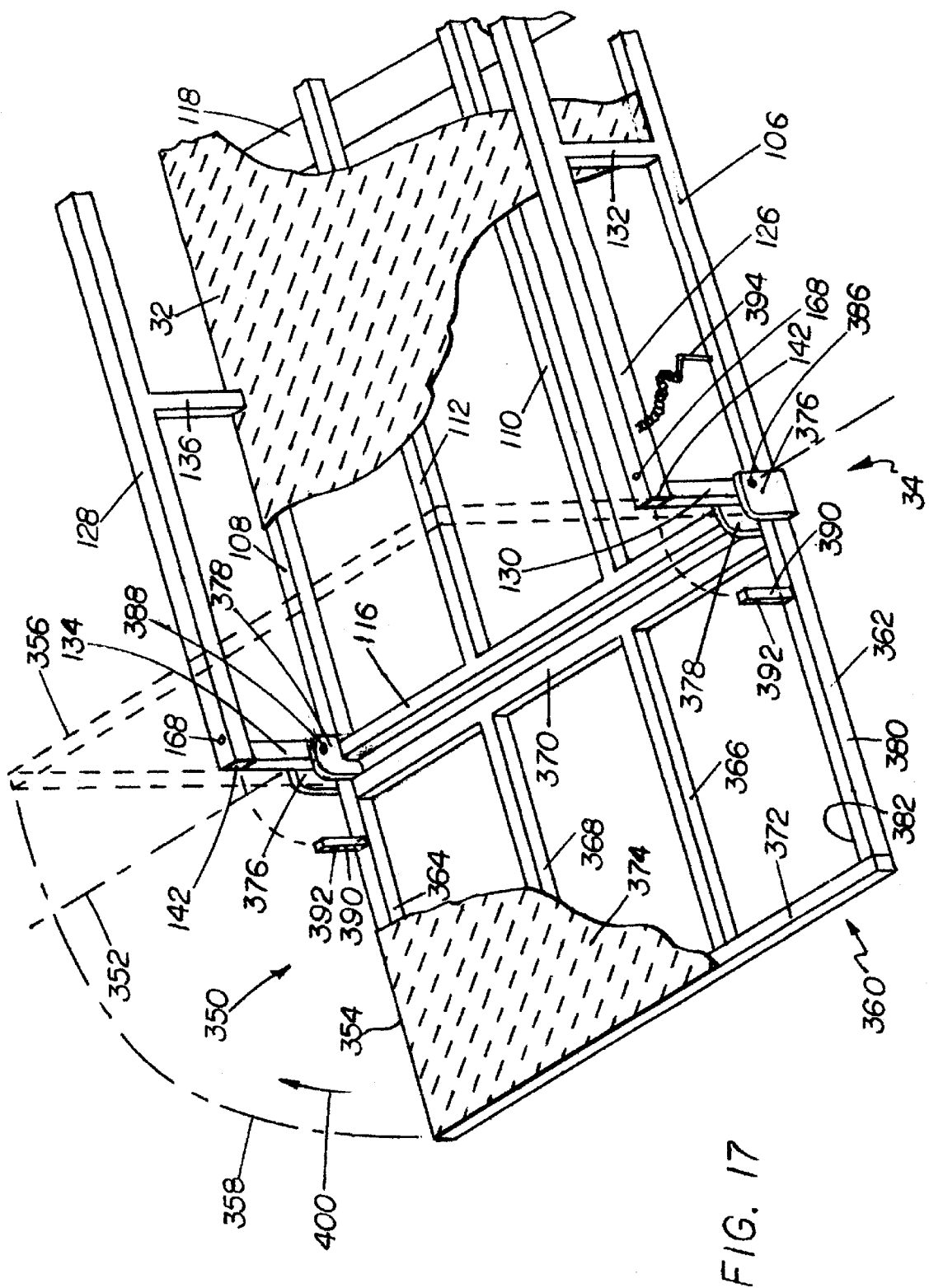
FIG. 17 is a perspective frontal view of a swing-up side gate mounted on a tiltable transporting apparatus of the invention.

In FIG. 17, a swing-up side gate 350 is shown on the loading side 34 of a transporting apparatus 10. The side gate 350 also serves as an extension ramp by which the loading/unloading angle 174 may be substantially reduced. For example, use of the side gate 350 may reduce the loading/unloading angle 174 from 40 degrees to about 23 degrees. The reduction is dependent upon several factors, including overall rack length, ground clearance, side gate dimensions, etc. The side gate 350 may be swung along line 358 about axis 352 between a lower position 354 (shown in solid lines) and an upper closed position 356 shown in hatch lines.

The basic construction of the side gate 350 may be like that of the carrying rack 30 itself. For example, a side gate frame 360 may be formed of square tubing including front gate member 362, rear gate member 364, front crosspiece 366, rear crosspiece 368, left member 370 and right member 372, all of which are joined by welding. The frame 360 is shown as being overlain with a material 374 which may be the same as that of platform 32, e.g. an expanded metal material.

As shown, outer and inner ears 376, 378 are welded to the sides 380, 382 of each of the front and rear gate members 362, 364. Each ear 376, 378 and end posts 130, 134 have holes aligned with rotational axis 352. The ears and end posts are joined by a front pin 386 and rear pin 388 as axles for rotation about axis 352 between a lower, loading/unloading position 354 and an upper closed position 356.

In addition, each of the front and rear gate members 362, 364 has attached to it a lug 390 which becomes positioned within an open end 142 of a front or rear rail 126, 128 when the swing-up side gate 350 is swung upwardly in direction 400. A hole 392 in each lug 390 becomes aligned with hole 168 in the front or rear rail 126, 128. Thus, a locking pin 394 may be inserted through a hole 392 and an aligned hole 168 to lock the side gate 350 in an upper closed position 356.

Figure 18:
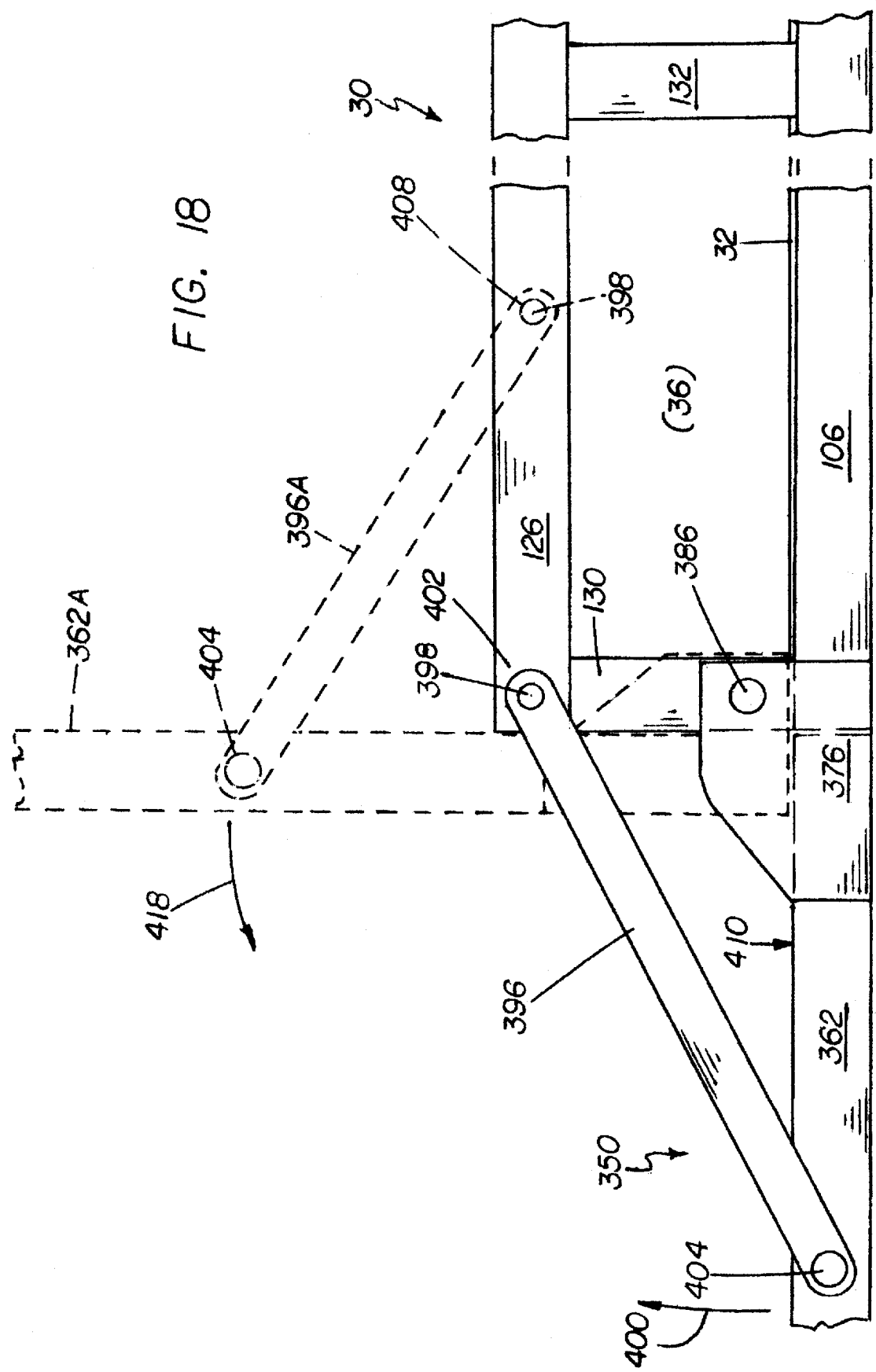
FIG. 18 is a frontal view of a further embodiment of a swing-up side gate mounted on a tiltable transporting apparatus of the invention.

Another embodiment of a swing-up side gate 350 is shown in FIG. 18. In this embodiment, the side gate 350 is lockable to the rack 30 to prevent swingable movement therefrom in at least the upward swinging direction 400. Like the embodiment of FIG. 17, ears 376, 378 welded to the side gate 350 are pivotably attached to the end portions 402 of the front and rear rails 126, 128. As already indicated, a rack 30 is not typically locked in the tilted for loading because a small vehicle 18 driven onto the rack is typically driven forward to weight the nonloading side 36 and drop it to an untilted, transport position where it is automatically locked by safety latch 212.

FIG. 18 is a front view of a support bar 396 for locking the swing-up side gate 350 in a lowered position such as roughly parallel to the platform 32 of the carrying rack 30. The support bar 396 is attached by a removable pin 398 to an end portion 402 of front rail 126 and by a permanent pin 404 to front gate member 362. When both pins 398 and 404 are in place, the gate 350 is locked against moving in either the upward direction 400 or the downward direction 418. Following removal of pin 398, the side gate 350 may be swung upward in direction 400 and locked in the upper closed position 362A by lockable placement of pin 398 (or another pin) in remote hole 408 such as in the front rail 126. It should be noted that the support bar 396 is in compression when a load 410 like an ATV is driven onto the side gate 350 and rack 30.

Figure 19:
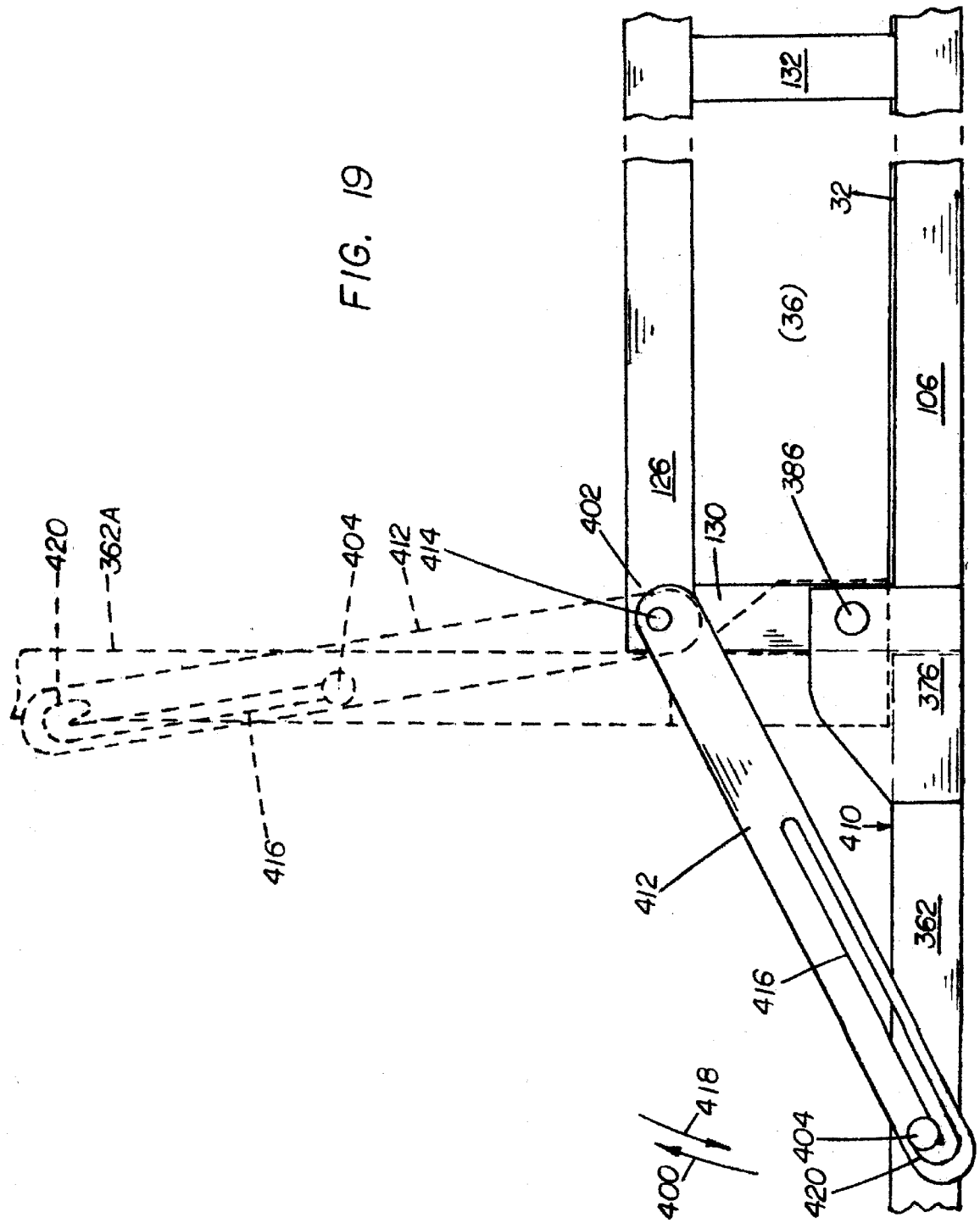
FIG. 19 is a frontal view of another embodiment of a swing-up side gate mounted on a tiltable transporting apparatus of the invention.

In another embodiment shown in FIG. 19, a support bar 412 is an elongate member pivotally attached by a permanent pin 414 to end portion 402 of the front rail 126. The support bar 412 has a longitudinal slot 416 with a a reverse drop slot 420 at its lower end 422. A headed pin 404 is permanently installed in front gate member 362 and slides in elongate slot 416 and the connected reverse drop slot 420. The weight of the support bar 412 keeps the pin 404 within or just below the reverse drop slot 420 so that application of a load 410 on the gate 350 will lock the pin 404 in the reverse drop slot, preventing upward movement of the gate along line 400.

In the upper, i.e. raised closed position 362A, the support bar 412 is shown as being generally parallel to the front gate member 362. If desired, pin 414 may be configured to be removable, and the gate 350 made lockable in the raised position 362A. Thus, pin 414 is removed and the support bar attached to a remote hole in rail 126 (see FIG. 18).

With reference to FIGS. 18 and 19, the support 396 or 410 and features related thereto are also found, as a mirror image, on the rear of the side gate 350 and carrying rack 30. Thus, the side gate 350 is supported at both the front and rear ends.

The tilting transporting apparatus 10 may also be adapted for use on a towable trailer 430. Such an exemplary use is depicted in FIGS. 20 through 25, where an exemplary trailer 430 has three tiltable transversely-loadable carrying racks 30A, 30B, and 30C mounted on a single-spine frame 432 with a transverse outrigger 434 for each rack. In addition, a fourth tiltable carrying rack 30D is rear-mounted for rear loading.

The construction of the racks 30A, 30B and 30C is shown as previously described, and each rack is supported on the single-spine frame 432 by a pair of hinges 82 formed of mating pipe or tube members 78, 82 welded to the rack or frame 432 in an alternate arrangement. Racks 30A, 30B and 30C are configured to load and unload on the right side 460 of the trailer 430, tiltable at an angle 464 of up to about 35–45 degrees from the horizontal.

An elongate reinforcement gusset 436 is welded to the underside 438 of a large portion or all of the single-spine frame 432. The front end of the frame 432 terminates in a tongue 442 with a hitch 444 and a leveling jack 446.

A laterally extending box frame 440 (see FIG. 25) is attached to the single-spine frame 432 and provides anchors for wheel springs 448 by which the wheels 450 and wheel axle 452 support the trailer 430. The axle 452 lies along axis 458 of wheel rotation. The box frame 440 also supports a container 454 for carrying various smaller items. The container 454 is shown with a closure lid 456. Other types of hinges may alternatively be used.

Rearward of the box frame 440, the single spine frame 432 continues rearward and becomes an "outrigger" 466 for rack 30D. To the rear end 468 of the outrigger 466 is welded a lateral hinge support member 470. Hinges 474 are attached to the lateral hinge support member 470 for tiltably supporting rack 30D. The rear end 472 of the rack 30D may be tilted downwardly to a ground level for loading and unloading a small vehicle onto the rack 30D. The tilting axis 482 of hinge 474 is shown as being parallel to the wheel axis 458.

A set of ears 480 is attached to the carrying rack 30D for locking the rack to the outrigger 466. A locking pin 484 is inserted through holes 486 in ears 480 and matching holes in outrigger 466.

Also shown in the drawings are taillights 476 on wheel fenders 490, and lights or reflectors 478 attached to rack 30D. Lights and reflectors may be installed on the trailer 430 in any manner which meets governmental regulations.

Structural members of the trailer 430 including the frame 432, outriggers 434 and 466, and support member 470 are preferably formed of square tubing of a size, wall thickness and material appropriate to the stresses to be encountered. The gusset 436 may also be formed of a smaller size square tubing. The racks 30 are largely formed of square tubing as previously described.

Previously described features and accessories of the tiltable rack 30 including the device for locking the rack 30 to the outrigger, counter spring 190, side rails and side gates, etc. may all be used with the trailer version of the invention.

A single tiltable rack 30 or multiple units may be mounted on a trailer frame 432, depending upon the number of small vehicles 18 to be transported.

Figure 20:
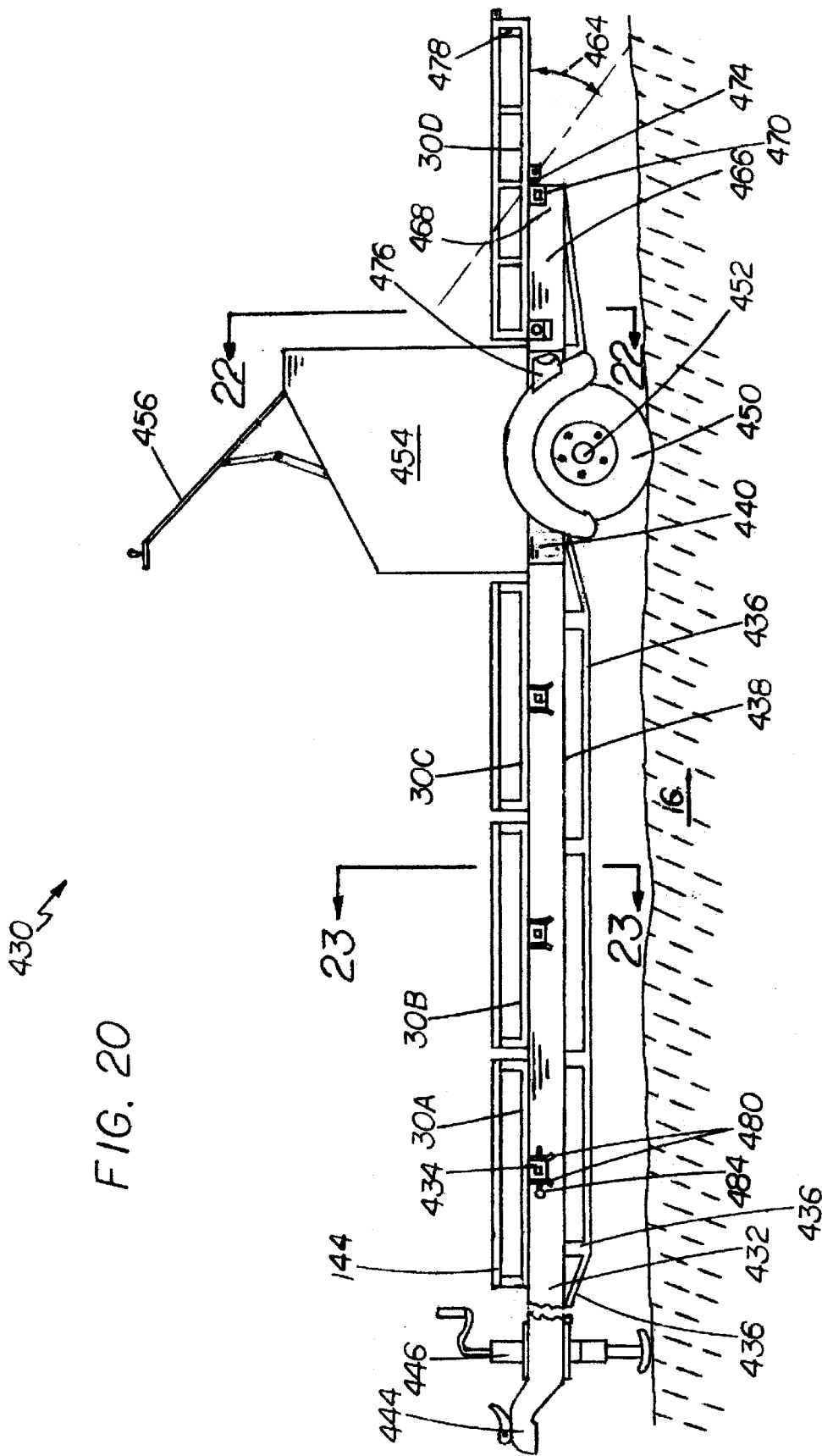
FIG. 20 is a left side view of a towable trailer embodying multiple tiltable carrying racks of the invention.

Although the most useful orientation of the tiltable rack 30 is such that loading and unloading of the rack is performed on the curb side (e.g. right side in the U.S.) of the host vehicle 12, the rack may be oriented to tilt downward for loading and unloading from the non-curb (e.g. left) side, or from the rear as shown with the trailer 430 in FIG. 20.

When constructed as described herein and attached to a Class 4 hitch receiver 14, the transporting apparatus 10 may support up to at least about 800 pounds (364 kg.) of weight, including a rider of about 200 pounds (91 kg.) and assuming a safety factor of about 100 percent. Thus, the apparatus may be used to transport nearly all models of 3-wheel and 4-wheel ATVs and riding lawn mowers currently manufactured. Of course, use of the trailer version is not dependent upon use of a class 4 hitch, unless the trailer 430 is of a size and weight which requires a class 4 hitch.

The apparatus 10 is intended primary for attachment to class 4 or higher hitch receivers 14 but may be attached to vehicles 12 having class 3 hitch receivers as well. However, the load capacity is thereby reduced by about 50 percent.

The rails 126, 128 of the carrying rack 30 and side rails 144, 160 provide locations surrounding the load for attachment of straps or lines to safely and effectively tie the load to the rack.

EXAMPLE

A prototype of the vehicle-supported transporting apparatus 10 of the invention was constructed from the following materials:

Frame 20: 2 inch (5.08 cm) square tubing with ¼ inch (0.635 cm) wall thickness, steel; overall frame length 72 inches (183 cm.).

Front frame gusset 46: 1.0 (2.54 cm) square tubing, ⅛ inch (0.3175 cm) wall thickness, steel.

Rear frame gusset 48: 1.25 inch (3.175 cm) square tubing, 14 AWG, steel.

Outrigger length 86: 35 inches (89 cm.)

Carrying Rack 30: 1.0 inch (2.54 cm) square tubing, ⅛ inch (0.3175 cm) wall thickness, steel.

Overall dimensions of carrying rack 30: 72 inches (183 cm.) wide by 50 inches (127 cm.) in axial length.

Platform 32 of carrying rack 30: rolled (flattened) ¾ inch (1.905 cm) expanded steel, #9.

Gripping bars on platform: none

Hinge sections 78: 4.0 inches (10.16 cm) long (schedule 40 steel pipe).

Hinge pin 98: ⅝ inch (1.5875 cm) diameter steel rod, 16 inches (41 cm.) long.

The transporting apparatus 10 was connected to a Class 4 hitch receiver on a truck and loaded with an engine weighing 1902 pounds (865 Kg.). The truck was then driven for about 60 miles on poorly maintained gravel and dirt roads in Montezuma County, Colo. The apparatus performed very well, and it was noted that there was no evidence of breaking, cracking, bending or other distortion of the transporting apparatus 10, hitch receiver 14, host vehicle 12 or the load.

In another test, a total of 1446 pounds (657 Kg.) was loaded on the transporting apparatus 10 and the host truck 12 driven between Cortez, Colo. and Shiprock, N. Mex. at highway speeds for about 150 miles on a blacktop road. Again, the transporting apparatus 10 worked very well, carrying the weight without sustaining any evidence of damage to the apparatus 10, hitch receiver 14, host vehicle 12 or the load.

In a third test, a Yamaha Kodiak ATV 18 weighing about 550 pounds (250 kg.) was transported on the transporting apparatus 10 for about 20 blacktop highway miles and about 30 miles of rough dirt and gravel roads between Cortez, Colo. and Groundhog Lake in the mountains north of Cortez. The apparatus performed flawlessly; there was no evidence of damage to the apparatus 10, hitch receiver 14, host vehicle 12 or the transported ATV.

The above detailed description of the various embodiments of the invention is provided as a full and enabling disclosure thereof. The description is intended to be exemplary of the invention and not be limiting. It is understood that various modifications, additions and alterations may be made in the above disclosed embodiments without departing from the spirit and scope of the invention. Therefore, the scope of the invention should be determined by reference to the appended claims in view of the above specification.

What is claimed is:

1. A drive-up transporting apparatus for transporting a small vehicle, comprising:
    a carrying rack for supporting a small vehicle driven thereonto from a ground level, said carrying rack having first and second sides, a front member, a rear member and a generally planar platform;
    an elongate support beam underlying and generally centrally bisecting said carrying rack in a first direction from said front member to said rear member;
    an outrigger joined to one side of said support beam in a normal direction thereto, said outrigger generally centrally bisecting said carrying rack in a second direction normal to said first direction; and
    a hinge having sections joined to said support beam and said carrying rack along a hinge axis whereby said carrying rack is tiltable about said hinge axis relative to said support beam;
    wherein said carrying rack is tiltable between a generally horizontal transport position wherein said first side abuts said outrigger, and a loading/unloading position wherein said first side is tilted upwardly above said outrigger and said second side is tilted downwardly to said ground level;
    a first locking means for locking said carrying rack in a transport position;
    a second locking means for automatically locking said carrying rack in a transport position;
    a third locking means for locking said carrying rack in a tilted position, said third locking means comprising:
        a sleeve rotatably mounted on said outrigger, said sleeve including opposing holes for passage of a locking pin therethrough;
        a sliding lock bar slidably mounted in said sleeve and having one end rotatably mounted to said carrying rack, said lock bar having a plurality of spaced holes therethrough; and
        a locking pin for passage through said holes in said sleeve and lock bar to lock said carrying rack in a tilted position.

2. A drive-up transporting apparatus, for transporting a small vehicle, comprising:
    a carrying rack for supporting a small vehicle driven thereonto from a ground level, said carrying rack having first and second sides, a front member, a rear member and a generally planar platform;
    an elongate support beam underlying and generally centrally bisecting said carrying rack in a first direction from said front member to said rear member;
    an outrigger joined to one side of said support beam in a normal direction thereto, said outrigger generally centrally bisecting said carrier rack in a second direction normal to said first direction; and
    a hinge having sections joined to said support beam and said carrying rack along a hinge axis whereby said carrying rack is tiltable about said hinge axis relative to said support beam;
    wherein said carrying rack is tiltable between a generally horizontal transport position wherein said first side abuts said outrigger, and a loading/unloading position wherein said first side is tilted upwardly above said outrigger and said second side is tilted downwardly to said ground level;
    wherein said carrying rack is biased by spring means to a tilted position, said spring means comprising a spring extending between said carrying rack and said support beam.

3. The drive-up transporting apparatus of claim 2, wherein said spring means is a coil spring.

4. The drive-up transporting apparatus of claim 2, wherein said carrying rack is configured to move from said tilted loading/unloading position to a automatically locked generally horizontal transport position upon loading of a small vehicle thereon, the weight of said small vehicle overcoming the biasing of said spring means.

5. A drive-up transporting trailer apparatus, comprising:
    an elongate single-spine trailer frame having a front end comprising a hitch for attachment to a host vehicle, and a wheeled axle mounted to said frame;

at least one carrying rack tiltably hinge-mounted across a central portion intermediate first and second sides of said rack to said single-spine frame to transversely tilt with respect to said single-spine frame wherein said first side tilts upwardly and said second side tilts downwardly to ground level; and an outrigger extending outwardly at a generally normal angle from said single-spine frame, said outrigger underlying said carrying rack on one side of said single-spine frame to support said rack in a said transport position;

wherein at least one carrying rack is hingedly attached to said single-spine frame for tilting about a front-to-rear hinge axis for drivably loading and unloading a small vehicle from a side of said trailer apparatus.

6. The drive-up transporting trailer apparatus of claim 5, wherein said side for loading and unloading said carrying rack comprises the right side of said host vehicle.

7. The drive-up transporting trailer apparatus of claim 5, wherein said single-spine frame comprises hollow square tubing.

8. A drive-up transporting apparatus for transporting a small vehicle, comprising:

a carrying rack for supporting a small vehicle driven thereonto from a ground level, said carrying rack having first and second sides, a front member, a rear member and a generally planar platform;

an elongate support beam underlying an generally centrally bisecting said carrying rack in a first direction from said front member to said rear member, said support beam having a front end configured to be inserted and retained in a standard 2.0 inch (5.1 cm.) hitch receiver of a host vehicle, whereby said transporting apparatus is totally supported by said hitch receiver;

an outrigger joined to one side of said support beam in a normal direction thereto, said outrigger underlying and generally centrally bisecting said carrying rack in a second direction normal to said first direction; and a hinge having sections joined to said support beam and said carrying rack along a hinge axis whereby said carrying rack is tiltable abouts said hinge axis relative to said support beam; and a downwardly extending bogey wheel assembly mounted on said transporting apparatus, said bogey wheel assembly comprising:

a telescoping strut having a rotatable wheel at one end thereof and a first hinge portion at the opposite end;

a second hinge portion mounted on said support beam forwardly of said outrigger for passage of a hinge pin through said first and second hinge portions for rotatabled attachment of said bogey wheel assembly to said support beams;

a hole through said outrigger for extending a pin past said strut to alternatively lock said strut in a lower ground contact position or in a retracted upper position adjacent said carrying rack;

a pin having a shaft and a handle normal to said shaft, said pin passing through said hole in said outrigger; and a slotted handle retainer for retaining said pin handle in a locked position.

9. The drive-up transporting apparatus of claim 8, further comprising a radial projection on said pin shaft preventing rotation of said pin shaft past said strut when said bogey wheel assembly is in said retracted upper position and said overlying carrying rack is locked in a position abutting said bogey wheel assembly.

10. The drive-up transporting apparatus of claim 8, wherein said wheel is aligned to move in a forward and rearward direction.

11. The drive-up transporting apparatus of claim 8, wherein said wheel is positioned whereby a major portion of the weight of said apparatus is rearward of said wheel.

12. The drive-up transporting apparatus of claim 8, wherein said wheel is forward of said first hinge portion.

13. A drive-up transporting apparatus for transporting a small vehicle, comprising:

a carrying rack for supporting a small vehicle driven thereonto from a ground level, said carrying rack having first and second sides, a front member, a rear member and a generally planar platform;

an elongate support beam underlying and generally centrally bisecting said carrying rack in a first direction from said front member to said rear member;

an outrigger joined to one side of said support beam in a normal direction thereto, said outrigger having an upper side and a lower side and generally centrally bisecting said carrying rack in a second direction normal to said first direction;

a hinge having sections joined to said support beam and said carrying rack along a hinge axis whereby said carrying rack is tiltable about said hinge axis relative to said support beam;

first locking means for locking said carrying rack in a transport position abutting said outrigger;

second locking means for automatically locking said carrying rack to said outrigger in a transport position, said second locking means comprising a pliant plate attached to said carrying rack and having a hook end portion slidably movable over said outrigger and latchable to the lower side thereof;

wherein said carrying rack is tiltable between a generally horizontal transport position wherein said first side abuts said outrigger, and a loading/unloading position wherein said first side is raised above said outrigger and said second side is lowered to said ground level.

14. The drive-up transporting apparatus of claim 13, wherein said small vehicle comprises one of an all-terrain vehicle (ATV), riding lawn mower, and small garden tractor, said small vehicle having a weight of about 200–700 pounds (91–318 kg.).

15. The drive-up transporting apparatus of claim 13, wherein said support beam comprises square tubing.

16. The drive-up transporting apparatus of claim 13, wherein said outrigger comprises square tubing.

17. The drive-up transporting apparatus of claim 13, wherein said carrying rack comprises a framework of square tubing with a platform configured for driving a small vehicle thereon when tilted and for support while transporting said vehicle thereon.

18. The drive-up transporting apparatus of claim 17, wherein said square tubing of said framework comprises tubing having side dimensions of one of 1.0 inch (2.5 cm.), 1.25 inch (3.2 cm.) and 1.5 inch (3.8 cm.).

19. The drive-up transporting apparatus of claim 13, wherein said carrying rack comprises:

a framework of front and rear members, first side member and second side member, and two longitudinal crosspieces extending from said first side member to said second side member parallel to and spaced from said front and rear members;

a platform overlying said framework and configured for support of a small vehicle thereon;

a front rail parallel to said front member and spaced upwardly therefrom by a plurality of posts; and a rear rail parallel to said rear member and spaced upwardly therefrom by a plurality of posts;

wherein said front and rear rails comprise hollow square tubing with open ends.

20. The drive-up transporting apparatus of claim 19, wherein said platform comprises a layer of expanded metal.

21. The drive-up transporting apparatus of claim 19, further comprising a removable side rail having a leg on each opposing end, said legs configured to be inserted into said open ends of said front and rear rails and locked therein.

22. The drive-up transporting apparatus of claim 19, further comprising:

a swing-up gate lockable in a lowered position generally parallel to said platform for drivable access of small vehicles on said gate to and from said tilted platform and lockable in a raised transport position to reduce the angle of said tilted platform with said ground level.

23. A drive-up transporting apparatus for transporting a small vehicle, comprising:

a carrying rack for supporting a small vehicle driven thereonto from a ground level, said carrying rack having first and second sides, a front member, a rear member and a generally planar platform;

an elongate support beam underlying and generally centrally bisecting said carrying rack in a first direction from said front member to said rear member, said support beam having a front end configured to be inserted and retained in a hitch receiver of a host vehicle;

an outrigger joined to one side of said support beam in a normal direction thereto, said outrigger underlying and generally centrally bisecting said carrying rack in a second direction normal to said first direction; and a hinge having sections joined to said support beam and said carrying rack along a hinge axis whereby said carrying rack is tiltable about said hinge axis relative to said support beam; and means for locking said carrying rack to said outrigger in a selected position about said hinge;

wherein said carrying rack is tiltable between a generally horizontal transport position wherein said first side abuts said outrigger, and a loading/unloading ramp position wherein said first side is raised above said outrigger and said second side is lowered to said ground level, and wherein said carrying rack is spring-biased to said loading/unloading ramp position and is weighted to said generally horizontal transport position by the weight of a small vehicle on said carrying rack.

24. The drive-up transporting apparatus of claim 23, wherein said locking means comprises:

ears attached to said carrying rack and extendable downwardly on each side of said outrigger, each said ear having a hole therethrough;

holes in said outrigger aligned with the holes in said ears; and a locking pin for lockable insertion through said holes in said ears and outrigger.

25. The drive-up transporting apparatus of claim 23, further comprising second locking means for automatically locking said carrying rack to said outrigger in a transport position.

26. The drive-up transporting apparatus of claim 25, further comprising third locking means for locking said carrying rack in a tilted position.

27. The drive-up transporting apparatus of claim 23, further comprising a downwardly extending bogey wheel assembly mounted on said transporting apparatus.

28. The drive-up transporting apparatus of claim 27, wherein said bogey wheel assembly is mounted to said support beam to swing laterally between a lower ground contactable position and an upper retracted position.

29. The drive-up transporting apparatus of claim 27, wherein said bogey wheel assembly is lockable in a plurality of overall lengths.

30. The drive-up transporting apparatus of claim 23, wherein said elongate support beam has a front end comprising a tongue for insertion into a standard 2.0 inch (5.1 cm.) hitch receiver for total support of said transporting apparatus.

31. The drive-up transporting apparatus of claim 30, wherein said hitch receiver is a class 4 or higher hitch receiver.

32. The drive-up transporting apparatus of claim 30, wherein said support beam is formed of square tubing.

33. The drive-up transporting apparatus of claim 32, wherein said square tubing of said support beam is tubing having side dimensions of one of 2.0 inch (5.1 cm.), 22.5 inch (5.7 cm.) and 2.5 inch (6.4 cm.).

34. The drive-up transporting apparatus of claim 30, wherein said outrigger comprises square tubing having side dimensions of 2.0 inch (5.08 cm.).

* * * * *